United States Patent
Jones et al.

(10) Patent No.: US 11,130,584 B2
(45) Date of Patent: Sep. 28, 2021

(54) DISCONNECT ASSEMBLY FOR AN AERIAL DELIVERY APPARATUS

(71) Applicant: IRVINGQ LIMITED, Mid Glamorgan (GB)

(72) Inventors: Martyn Philip Jones, Mid Glamorgan (GB); Richard Anthony Laws, Coity (GB)

(73) Assignee: IRVINGQ LIMITED, Mid Glamorgan (GB)

( * ) Notice: Subject to any disclaimer, the term of this patent is extended or adjusted under 35 U.S.C. 154(b) by 628 days.

(21) Appl. No.: 15/937,805

(22) Filed: Mar. 27, 2018

(65) Prior Publication Data

US 2019/0202569 A1 Jul. 4, 2019

(30) Foreign Application Priority Data

Jan. 2, 2018 (GB) .................................... 1800037

(51) Int. Cl.
*B64D 17/38* (2006.01)
*F16B 21/12* (2006.01)

(52) U.S. Cl.
CPC ............ *B64D 17/383* (2013.01); *F16B 21/12* (2013.01)

(58) Field of Classification Search
CPC . B64D 1/08; B64D 1/12; B64D 17/22; B64D 17/38; B64D 17/383; F16B 21/12
USPC ............................................. 244/151 B, 152
See application file for complete search history.

(56) References Cited

U.S. PATENT DOCUMENTS

| 2,843,416 | A | * | 7/1958 | Forrest | B64D 17/383 294/82.25 |
|---|---|---|---|---|---|
| 2,919,154 | A | * | 12/1959 | Schart | B64D 17/383 294/82.25 |
| 2,924,408 | A | * | 2/1960 | Yost | B64D 17/383 244/137.4 |
| 3,393,001 | A | * | 7/1968 | Beckwith, Jr. | B64D 17/383 294/82.25 |
| 3,408,026 | A | * | 10/1968 | Kriesel | B64D 17/386 244/152 |
| 3,979,803 | A | * | 9/1976 | Clarke | B64D 17/38 24/494 |

(Continued)

OTHER PUBLICATIONS

Chris Bennett, "Search Report under Section 17", dated Jul. 2, 2018, GB Application No. 1800037.2.

(Continued)

*Primary Examiner* — Brady W Frazier
(74) *Attorney, Agent, or Firm* — LeonardPatel PC; Sheetal S. Patel; Michael A. Leonard, II

(57) ABSTRACT

A disconnect assembly configured to disconnect a parachute of an aerial delivery apparatus from a payload includes a detector device, a disconnect device, and a transmit cable. The detector device is configured to detect that the aerial delivery apparatus has landed, the disconnect device is configured to provide a releasable connection between the parachute and the payload, and the transmit cable is configured to transmit a mechanical trigger force from the detector device to the disconnect device. When the detector device detects that the aerial delivery apparatus has landed, the transmit cable transmits a mechanical trigger force from the detector device to the disconnect device and the disconnect device releases the connection between the parachute and the payload.

32 Claims, 14 Drawing Sheets

(56) References Cited

U.S. PATENT DOCUMENTS

| | | | | |
|---|---|---|---|---|
| 5,687,931 | A | * | 11/1997 | Hogan .................. B64D 17/38 244/151 B |
| 8,272,598 | B2 | * | 9/2012 | Obkircher ................ B64D 1/14 244/151 B |
| 2008/0302917 | A1 | | 12/2008 | Sadeck |
| 2009/0127397 | A1 | * | 5/2009 | Hyunh ................ B64D 17/383 244/152 |
| 2011/0297791 | A1 | * | 12/2011 | Sadeck ................. B64D 17/38 244/151 B |
| 2012/0256054 | A1 | * | 10/2012 | Tayar .................. B64D 17/383 244/151 B |
| 2013/0240674 | A1 | * | 9/2013 | Forsans ................. B64D 17/62 244/137.4 |

OTHER PUBLICATIONS

European Search Report, dated May 16, 2019, European Patent Application No. 18248172.

* cited by examiner

DISCONNECT ASSEMBLY FOR AN AERIAL DELIVERY APPARATUS

CROSS-SECTION TO RELATED APPLICATION

This application claims the benefit of United Kingdom Patent Application No. 180037.2, filed on Jan. 2, 2018. The subject matter thereof is hereby incorporated herein by reference in its entirety.

FIELD

The present invention generally relates to a disconnect assembly for an aerial delivery apparatus.

BACKGROUND

The longer a parachute is left attached to a payload once landed on the ground, the likelihood the lines of the parachute becoming tangled is increased, as well as the likelihood of the payload being dragged along the ground or water away from the expected location (by wind in the parachute) is increased and the likelihood of the payload being toppled over by side winds acting on the parachute is increased.

For this reason, various types of disconnect assemblies are provided. For example, one example of a disconnect assembly has a detector device that detects that the aerial delivery device has landed, by detecting that there is no tension load on one or more of the parachute lines ("load-off" detection). However, this suffers from the fact that the detector device may not detect landing if there is a side wind, for example, when the parachute lines still experience a tension load. In addition, care needs to be taken to ensure the detector does not falsely detect landing upon the aerial delivery apparatus leaving an aircraft, when there is no initial tension load on the parachute lines.

Another example of a disconnect assembly has a detector device with an electrical sensor that detects landing in salt water. However, this does not work for landing in fresh water (e.g. in a lake) or on the ground.

A further example of a disconnect assembly has a disconnect device including a pyrotechnic charge. However, this type of disconnect assembly requires extensive refurbishment to re-use the parachute or aerial delivery platform.

Thus, an alternative disconnect assembly may be beneficial to mitigate the above-mentioned problems.

SUMMARY

Certain embodiments of the present invention may provide solutions to the problems and needs in the art that have not yet been fully identified, appreciated, or solved by current disconnect assembly systems. For example, some embodiments generally pertain to a disconnect assembly for disconnecting a parachute of an aerial delivery apparatus from a payload of the aerial delivery apparatus.

In an embodiment, a disconnect assembly for disconnecting a parachute of an aerial delivery apparatus from a payload of the aerial delivery apparatus may include a detector device configured to detect that the aerial delivery apparatus has landed. The disconnect assembly may also include a disconnect device configured to provide a releasable connection between the parachute and the payload. The disconnect assembly may include a transmit cable configured to transmit a mechanical trigger force from the detector device to the disconnect device. When detector device detects that the aerial delivery apparatus has landed, the transmit cable is configured to transmit a mechanical trigger force from the detector device to the disconnect device, causing the disconnect device to release the connection between the parachute and the payload.

In another embodiment, a kit of parts for assembling a disconnect assembly, and for disconnecting a parachute of an aerial delivery apparatus from a payload of the aerial delivery apparatus, may include a detector device configured to detect that the aerial delivery apparatus has landed. The kit may also include a disconnect device configured to provide a releasable connection between the parachute and the payload, and a transmit cable configured to transmit a mechanical trigger force from the detector device to the disconnect device.

In yet another embodiment, an aerial delivery apparatus may include a parachute, a payload, and a disconnect assembly. The disconnect assembly may include a disconnect device configured to provide a releasable connection between the parachute and the payload. The disconnect assembly may include a transmit cable configured to transmit a mechanical trigger force from the detector device to the disconnect device. When detector device detects that the aerial delivery apparatus has landed, the transmit cable is configured to transmit a mechanical trigger force from the detector device to the disconnect device, causing the disconnect device to release the connection between the parachute and the payload.

In yet another embodiment, a method of disconnecting a parachute of an aerial delivery apparatus from a payload of the aerial delivery apparatus may include detecting, by a detector device, that the aerial delivery apparatus has landed. The method may also include transmitting, by a transmit cable, a mechanical trigger force from the detector device to a disconnect device, and releasing, by the disconnect device, a connection between the parachute and the payload.

DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION

Some embodiments generally pertain to aerial delivery apparatus and disconnect assemblies that are configured to disconnect a parachute of an aerial delivery apparatus from a payload of an aerial delivery apparatus. In some embodiments, a disconnect assembly may disconnect a parachute of an aerial delivery apparatus from a payload of the aerial delivery apparatus, and may include a detector device for detecting that the aerial delivery apparatus has landed and a disconnect device for providing a releasable connection between the parachute and the payload.

Certain embodiments pertain to a kit of parts for assembling a disconnect assembly. In those embodiments, an aerial delivery apparatus includes a parachute, a payload, and a disconnect assembly, and a method of disconnecting a parachute of an aerial delivery apparatus from a payload of the aerial delivery apparatus.

Figure 1:
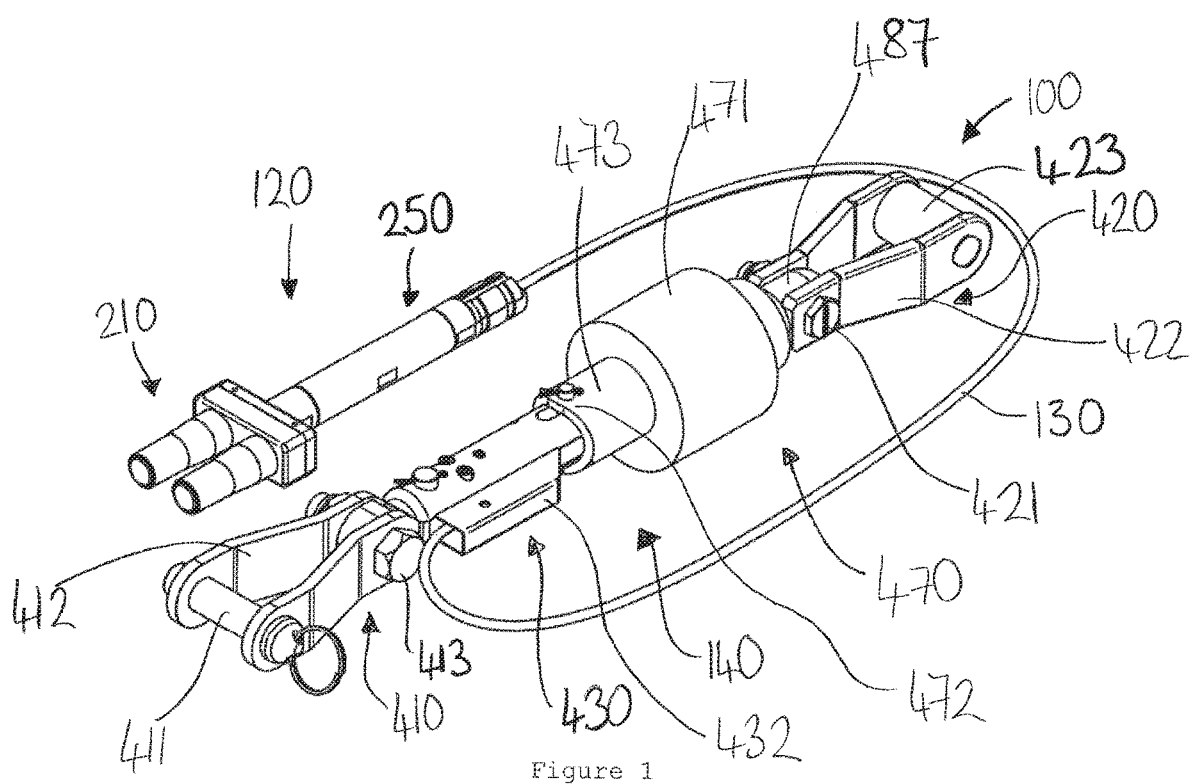
FIG. 1 shows a perspective view of a disconnect assembly, according to a first embodiment of the invention.

FIG. 1 shows a perspective view of a disconnect assembly 100, according to a first embodiment of the invention.

The disconnect assembly 100 comprises a detector device 120 which is connected to a disconnect device 140 by a transmit cable 130. The detector device 120 comprises a water sensor device 210 and a trigger mechanism 250. The disconnect device 140 comprises a first attachment portion 410 for attaching to a payload (not shown), a second attachment portion 420 for attaching to a parachute (not shown) and a release mechanism body 430 in between the two attachment portions 410, 420.

The first attachment portion 410 has a handle 412 with a webbing pole 411 (for attaching to webbing of a payload) and a bolt 413 for attaching to a first end of the release mechanism body 430, as will be described later. The second attachment portion 420 has a handle 422 with a webbing pole 423 (for attaching to webbing of a parachute) and a bolt 421 for attaching to a second, opposite end of the release mechanism body 430.

The release mechanism body 430 will be described in more detail later, but in relation to FIG. 1, it can be seen that it is elongate, with an open cover 432 to allow for the transmit cable 130 to pass through and attach to a linkage assembly (440, 450, 460, not shown in FIG. 1) inside. The release mechanism body also has an impact protector device 470 attached to an outer sleeve 473 of the release mechanism 471 and a foam impact protector 471 on the device 470. The outer sleeve 473 is connected to the rest of the body 430 by a slot connection 472 to allow for relative movement of the outer sleeve 473.

At the second end of the release mechanism body 430 is a release pin 487. The bolt 421 of the second attachment portion is attached to the pin 487, as will be described later.

Figure 2A:
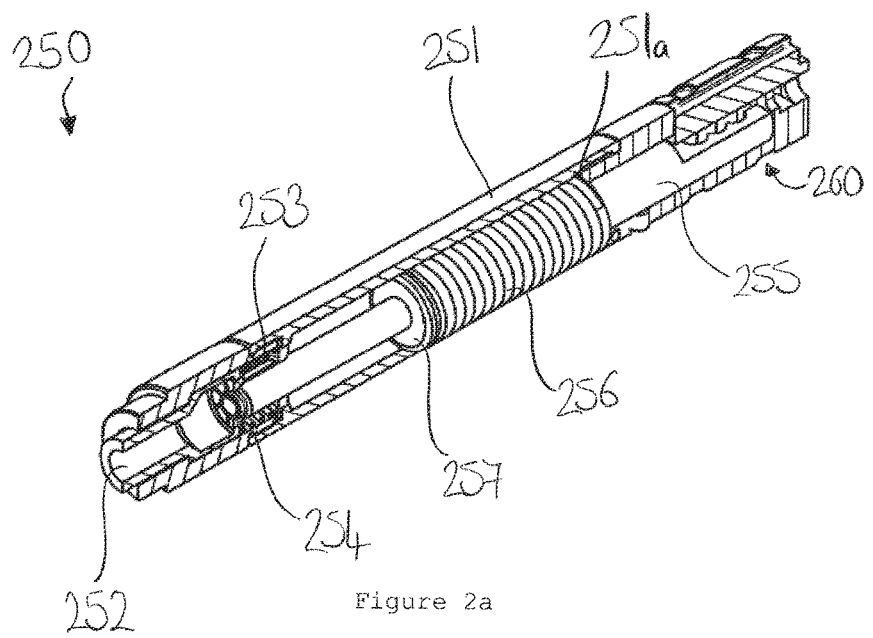
FIG. 2a shows a perspective, cut-away view of a trigger mechanism, part of the disconnect assembly of FIG. 1, according to a first embodiment of the invention.
Figure 2B:
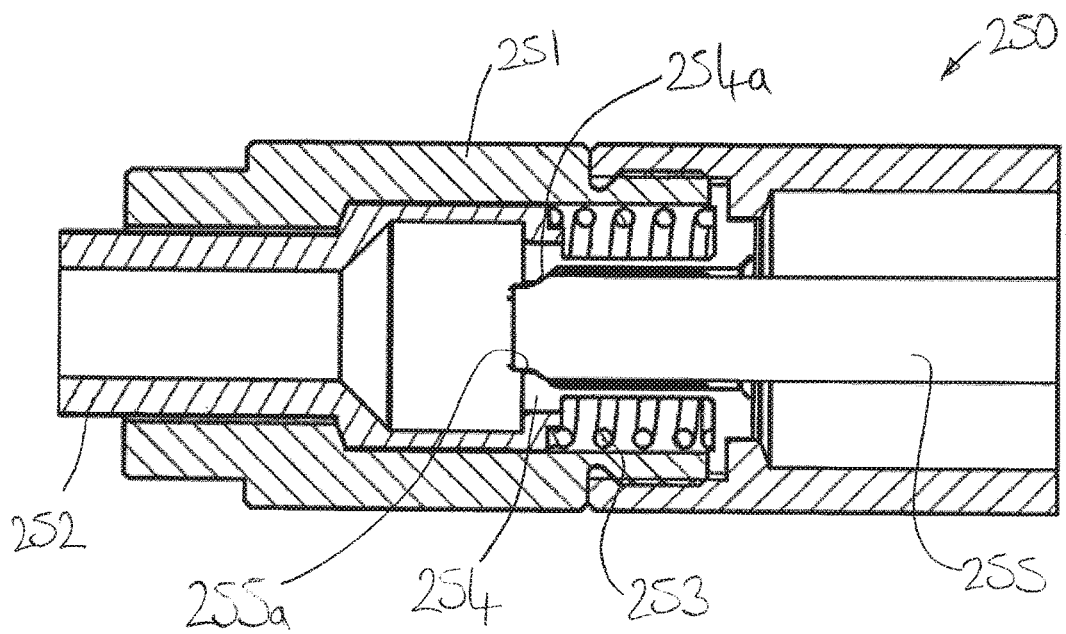
FIG. 2b shows an enlarged, cut-away side view of the trigger mechanism of FIG. 2a, the trigger mechanism in an un-triggered position, according to a first embodiment of the invention.

FIG. 2a shows a perspective, cut-away view of the trigger mechanism 250. The trigger mechanism 250 comprises an elongate cylindrical casing 251. Inside the casing, there is a trigger sleeve 252 at a first end. This trigger sleeve 252 is connected to the sensor device 210, as will be described later. A plunger rod 255 is located within the casing 251 along most of its length. Towards a first end, near the trigger sleeve 252, the plunger rod 255 has a narrowed portion 255a, which corresponding to the shape of an enlarged lip portion 245a of a collet 254 which surrounds the plunger rod 255 and holds it in place (see FIG. 2b). As can be seen in FIG. 2b, the collet 254 is held in the position where it holds the plunger rod 255, by the trigger sleeve 252. More specifically, an end portion of the trigger sleeve surrounds the end of the collet 254, thereby preventing fingers of the collet 254 from expanding. The trigger sleeve 252 is prevented from moving along the casing 251 by a spring 253. Therefore, a force is required on the sleeve 252 to move it towards the right hand side of FIG. 2b.

Figure 2C:
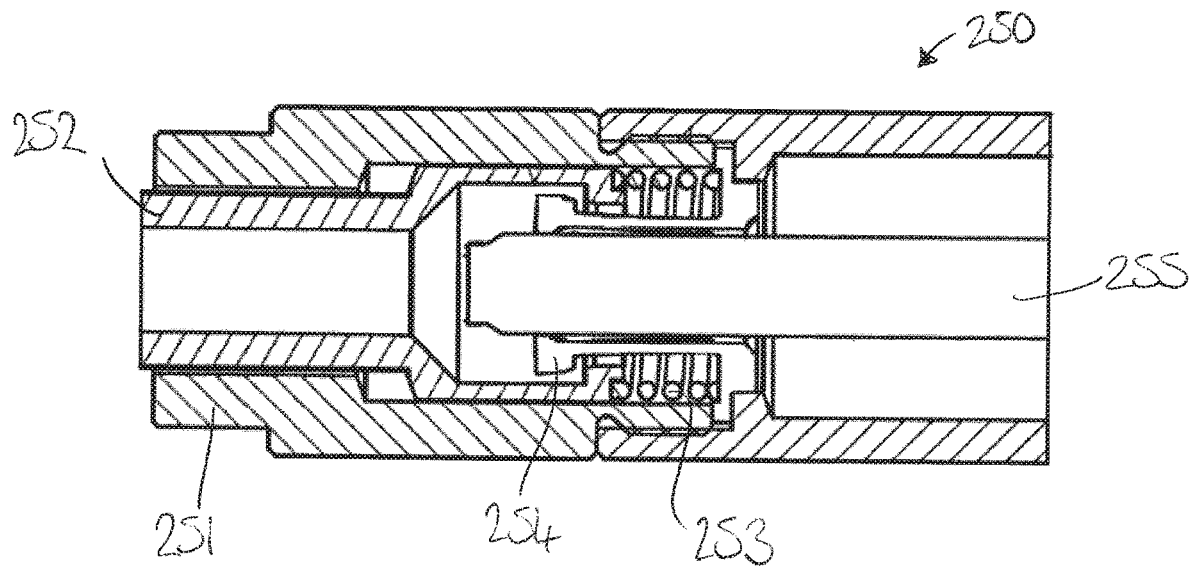
FIG. 2c shows an enlarged, cut-away side view of the trigger mechanism of FIG. 2a, the trigger mechanism in a partially triggered position, according to a first embodiment of the invention.

When a sufficient force is exerted on sleeve 252 (in the right hand direction, as shown), the sleeve 252 pushes to compress the spring 253 and thereby moves away from holding the collet 254. This allows the collet fingers to expand and release the plunger rod 255. This allows the plunger rod 255 to move towards the left hand side, as shown. This can be seen in FIG. 2c.

Figure 2D:
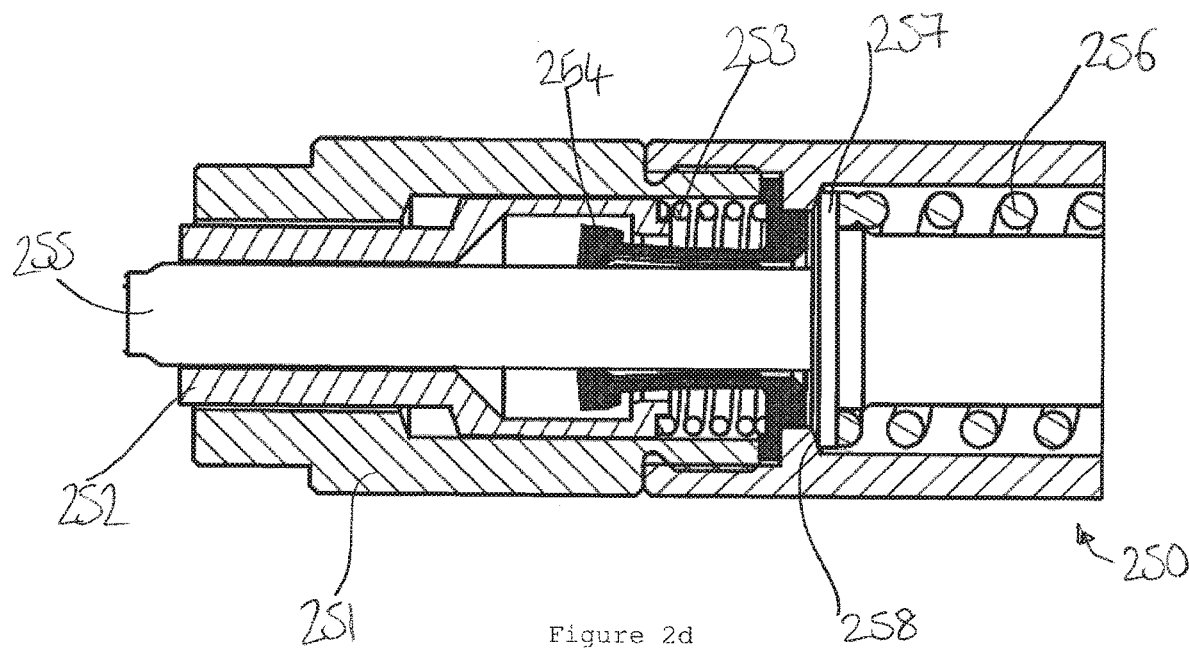
FIG. 2d shows an enlarged, cut-away side view of the trigger mechanism of FIG. 2a, the trigger mechanism in a fully-triggered position, according to a first embodiment of the invention.

As can be seen in FIG. 2a, the plunger rod has a plunger plate 257 further along its length and a spring 256 surrounds the rod 255 in between the plunger plate 257 and an interior abutment surface 251a of the casing 251. This spring 256 is compressed, as shown in FIG. 2a, and when the plunger rod 255 is released by the collet 254, this spring pushes against the plunger plate 257 and causes the plunger rod 255 to move towards the left side, as shown. Hence, the plunger rod 255 moves to the left hand side, until the plunger plate 257 abuts against a second internal abutment surface 258 of the casing 251, as shown in FIG. 2d.

The trigger mechanism includes an attachment arrangement 260 at its second end. This is shown in more detail in FIG. 2e. The attachment arrangement 260 attaches the transmit cable 130 to the trigger mechanism 250.

The transmit cable is approximately 10 metres in length and comprises an inner cable line 131 and an outer cable housing 132. The inner cable line 131 transmits a mechanical force and the outer cable housing protects the inner line from damage. It also allows the cable 130 to be secured to the trigger mechanism 250 and also to the disconnect device 140, as will be described later. The outer cable housing is in the form of a twin-trapezoidal helix design. This minimises the change in length of the housing as the cable 130 is flexed or coiled.

Figure 2E:
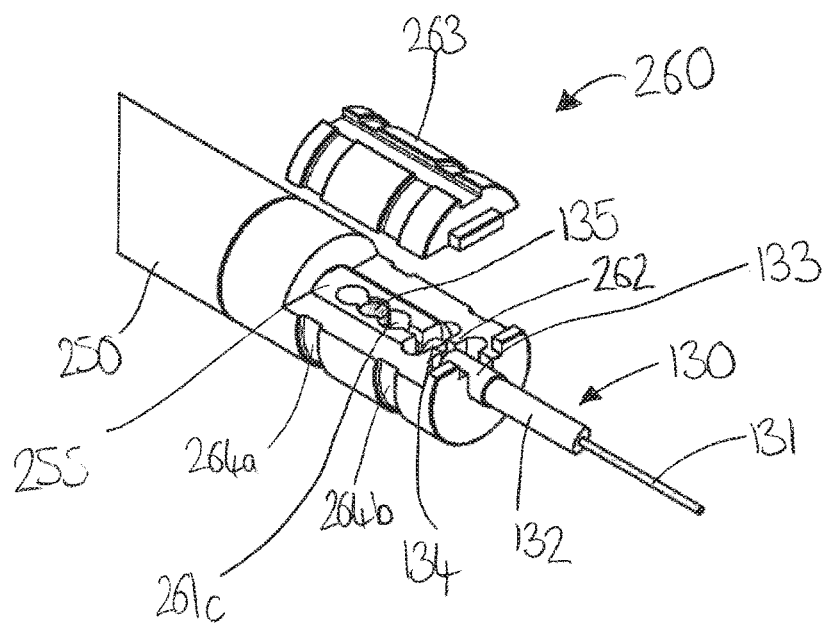
FIG. 2e shows a perspective view of one end of the trigger mechanism of FIG. 2a, showing an attachment arrangement attaching a transmit cable to the trigger mechanism, according to a first embodiment of the invention.

The arrangement 260 includes three holes 261 (the furthest right hole, as shown, being labelled as 261c in FIG. 2e) in the end of the plunger rod 255. These holes 261 accommodate a cylindrical nub 135 at a first end of the inner cable line 131 of the transmit cable 130 in different longitudinal positions, depending on the length difference from the end of the outer cable housing 132 (i.e. tension) required. This is dependent on the curvature of the transmit cable 131 between the detector device 120 and the disconnect device 140 and also allow for manufacturing tolerances. As can be seen in FIG. 2e, the nub 135 is located in the middle hole (261b).

The arrangement 260 also comprises a slot 262 in the casing 251. An outer casing 132 of the transmit cable has an end frame 133 attached to it. The end frame 133 has a circular end frame plate 134 on a neck portion. The end frame plate 134 sits above the slot 262 with the neck of the end frame passing through the slot 262.

Hence, the outer casing of the transmit cable 130 is held in place on the trigger mechanism casing 251, and the inner cable 131 is attached to the plunger rod 255.

The arrangement 260 also comprises an access lid 263, which is placed on top of the attachment arrangement previously described and secured in place by two cable ties (not shown) located in grooves 264 a, b around the circumference of the casing 251 and lid 263.

Figure 3A:
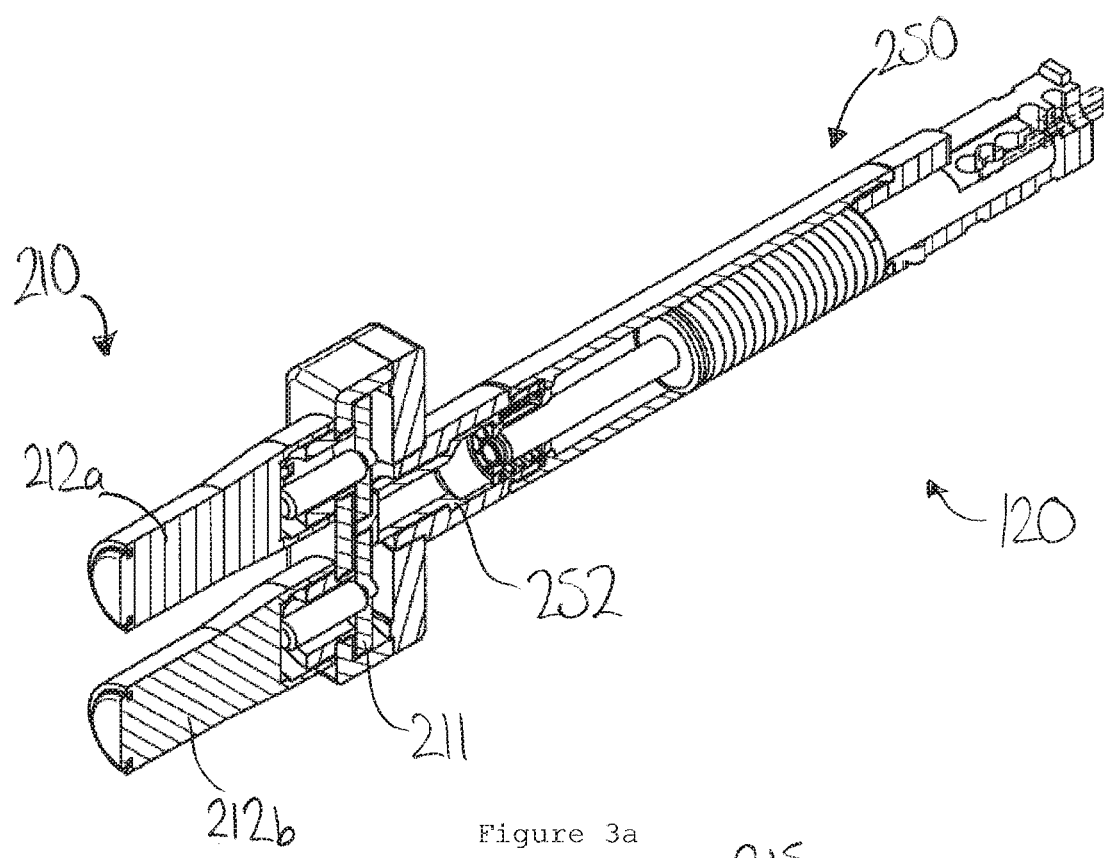
FIG. 3a shows a perspective, cut-away view of a detector device comprising a water sensor device attached to the trigger mechanism of FIG. 2a, according to a first embodiment of the invention.

FIG. 3a shows a perspective, cut-away view of a detector device 120 comprising a water sensor device 210 attached to the trigger mechanism 250. As can be seen here, the trigger sleeve 252 is attached to a trigger plate 211 in the water sensor device 210. The water sensor device also has two water sensor cartridges 212a, 212b. These cartridges may be the same or similar to those already used to trigger inflation of lifejackets.

Figure 3B:
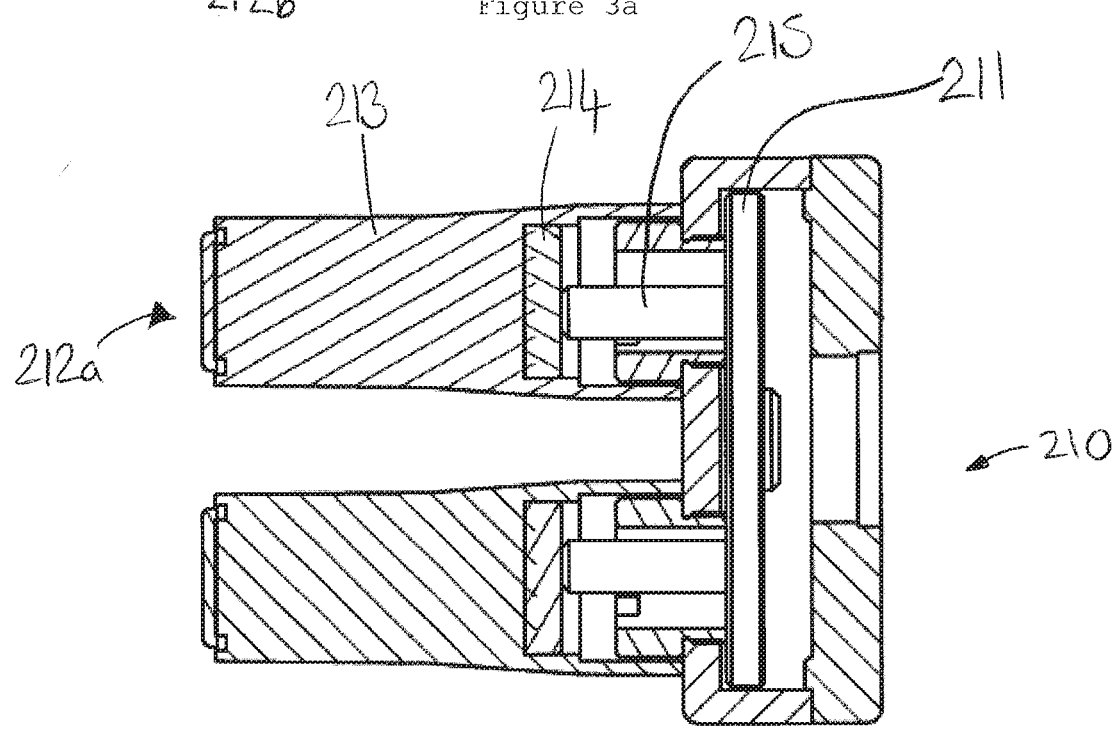
FIG. 3b shows an enlarged, cut-away side view of the water sensor device of FIG. 3a, the water sensor device in an un-triggered position, according to a first embodiment of the invention.

As seen in more detail in FIG. 3b, each water sensor cartridge 212 has a water chamber 213, into which water can enter, and which contains a paper annulus (not shown), that is softened and ruptures when water is detected. Each cartridge 212 has a corresponding plunger 214 restrained by the corresponding paper annulus. The plunger 214 acts on a detector rod 215 and each rod 215 is attached to the trigger plate 211.

Figure 3C:
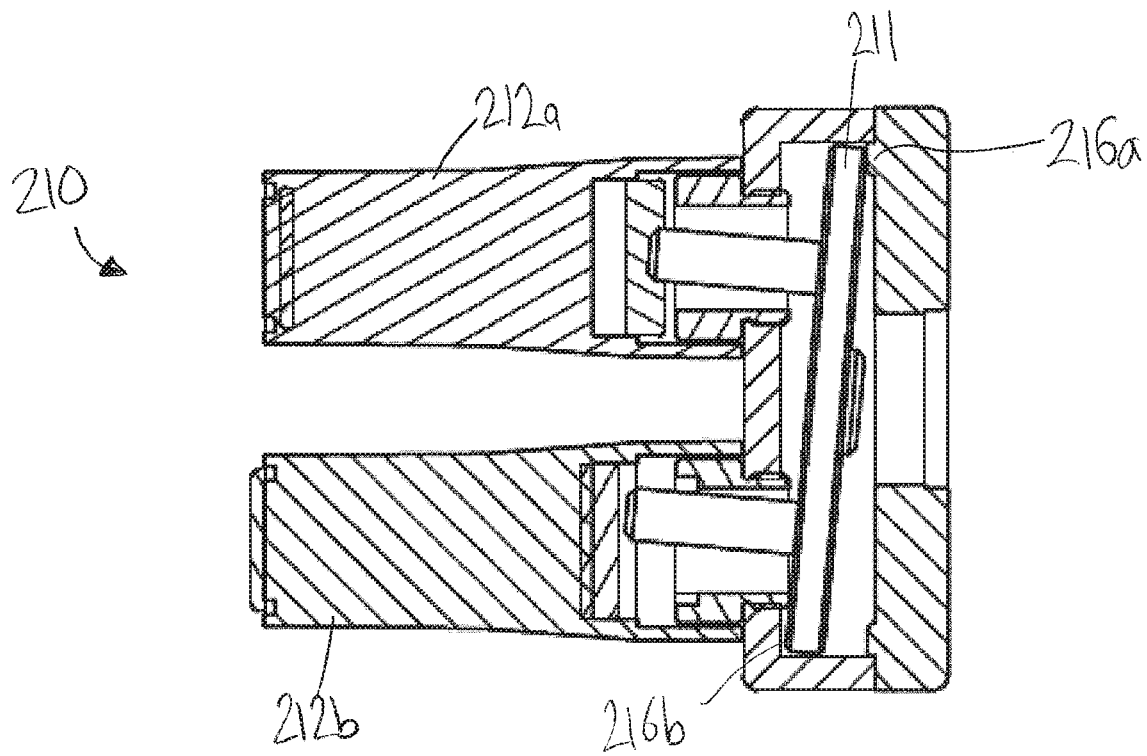
FIG. 3c shows an enlarged, cut-away side view of the water sensor device of FIG. 3a, the water sensor device in a one-cartridge-partially-triggered position, according to a first embodiment of the invention.
Figure 3D:
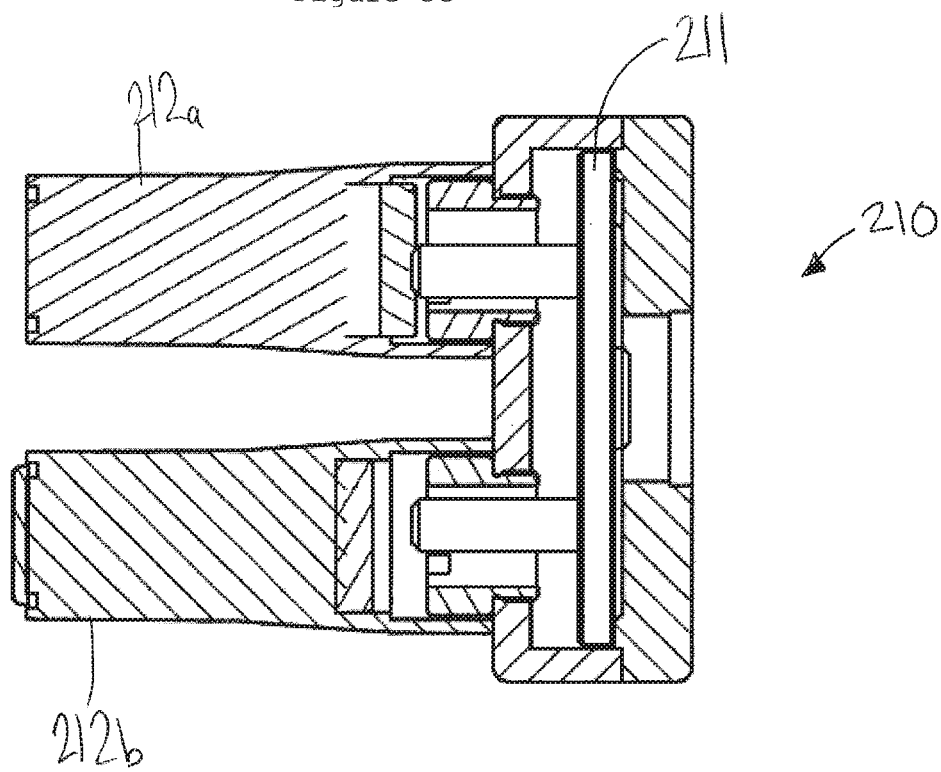
FIG. 3d shows an enlarged, cut-away side view of the water sensor device of FIG. 3a, the water sensor device in a one-cartridge-fully-triggered position, according to a first embodiment of the invention.

When water is detected by a paper annulus, the corresponding rod 215 is pushed about 5 mm under the action of the plunger 214 and a spring (not shown). This causes the plate 211 to move towards the trigger sleeve 252. This can be seen in FIG. 3c. If both annuli 214 are ruptured, both rods 215 are pushed back and the trigger plate 211 is pushed on both sides towards the trigger sleeve 252. If only one paper annulus is ruptured, only one rod 215 moves. However, a fulcrum 216 a, b action on the inside of the water sensor device 210 causes the plate 211 to pivot so as to still push against the trigger sleeve 252, as shown in FIG. 3d.

Figure 4A:
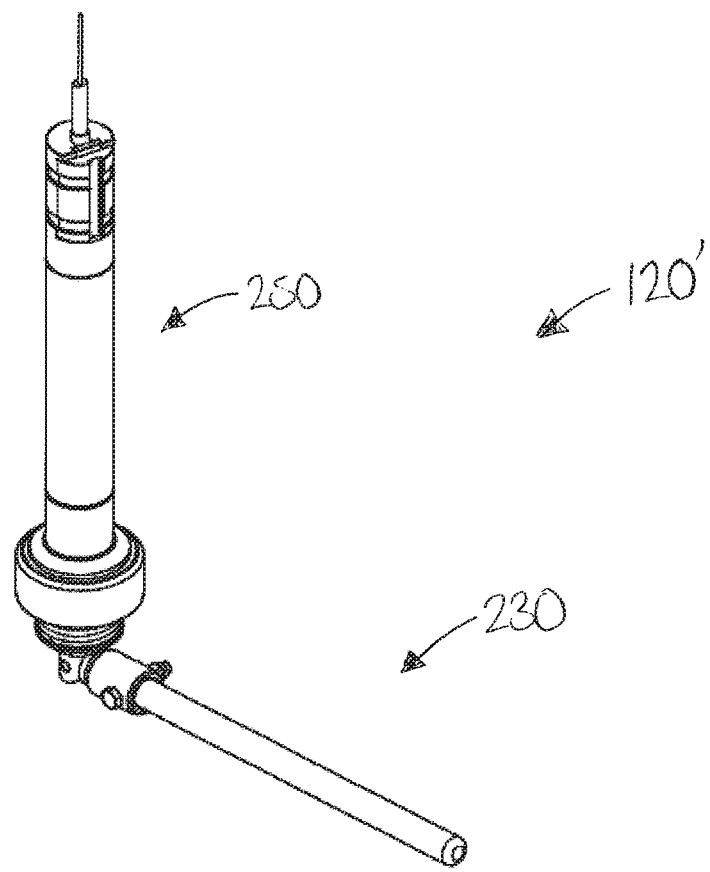
FIG. 4a shows a perspective view of an alternative detector device, comprising a land sensor device attached to the trigger mechanism of FIG. 2a, according to a first embodiment of the invention.

FIG. 4a shows a perspective view of an alternative detector device 120', comprising a land sensor device 230 (instead of the water sensor device 210) attached to the trigger mechanism 250. The land sensor device 230 is in a stowed position.

Figure 4B:
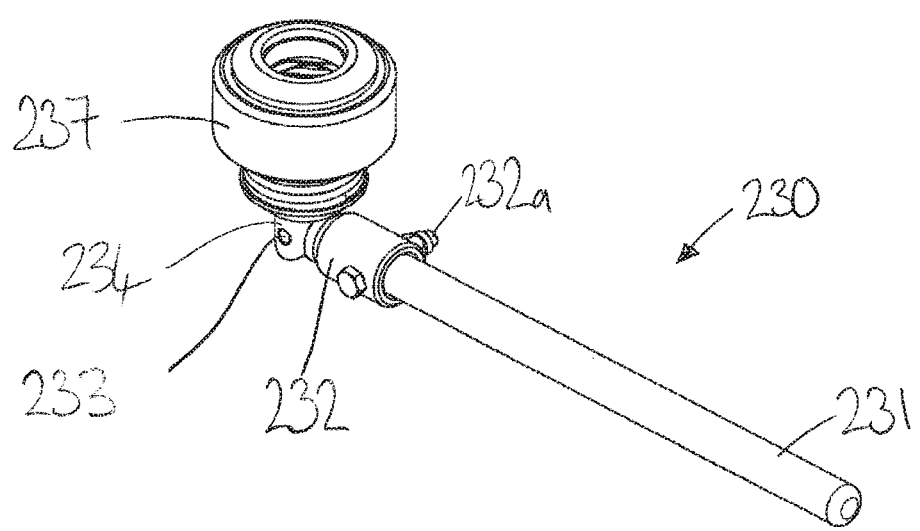
FIG. 4b shows an enlarged perspective view of the land sensor device of FIG. 4a, the land sensor device in a stowed position, according to a first embodiment of the invention.

FIG. 4b shows the land sensor device 230 in more detail. Here, it is still in the stowed position. The device 230 comprises a sacrificial rod 231 mounted in a frame 232, by a friction screw 232a. The frame 232 is pivotally mounted (at hinge point 233) to a plunger 234. In the stowed position, as show in in FIGS. 4a and 4b, the frame 232 is pivoted with respect to the plunger 234 so that the rod 231 extends approximately perpendicular to the trigger mechanism 250 and a housing 237 of the land sensor device 230. The rod 231 could be held in this stowed position by contact with an aircraft floor, or another suitable surface. When the aerial delivery platform (using the disconnect assembly) is released from the aircraft and the rod 231 is no longer in contact with the aircraft floor/other surface, it will swing into the armed position shown in FIG. 4d.

Figure 4C:
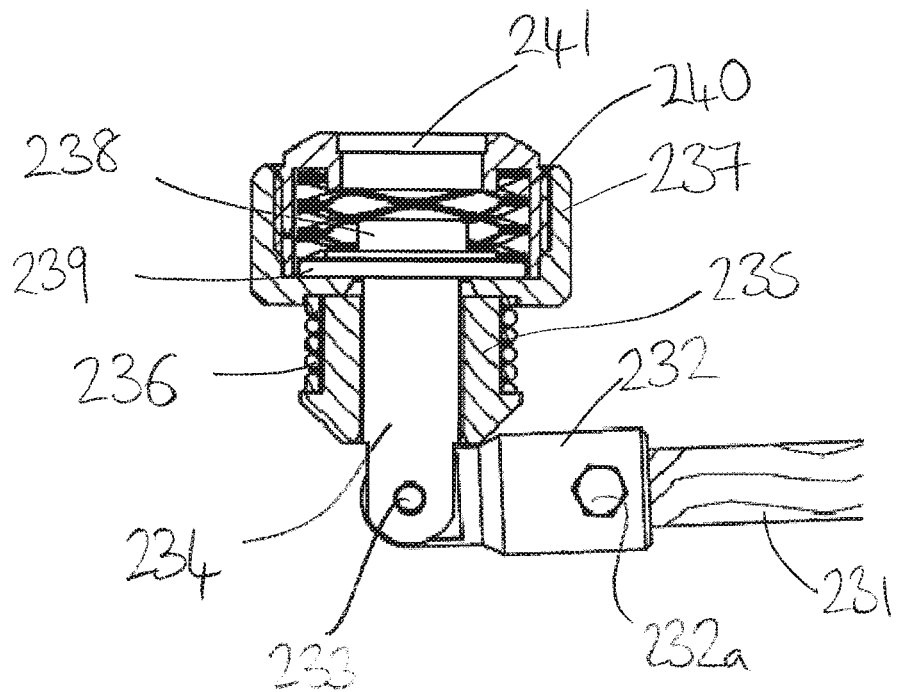
FIG. 4c shows an enlarged, cut-away side view of the land sensor device of FIG. 4a, the land sensor device in the stowed position, according to a first embodiment of the invention.

FIG. 4c is an enlarged, cut-away side view of the land sensor device 230 in the stowed position. This shows a locking ring 235 located around the plunger 234. A spring 236 biases the locking ring downwards, away from the housing 237, as shown. Hence, when the rod 231 swings downwards (see FIG. 4d), the locking ring is urged downwards so that it surrounds the hinge point 233 and prevents the rod 231 moving back to the stowed position.

Figure 4D:
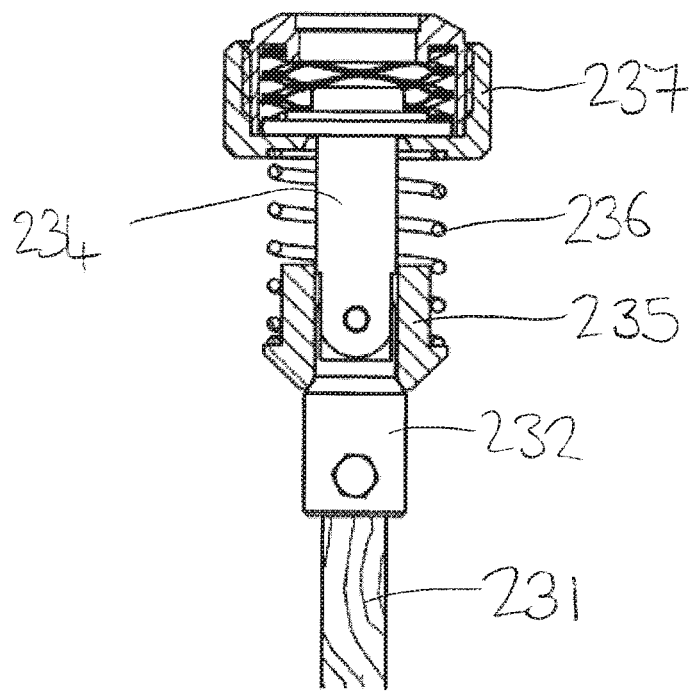
FIG. 4d shows an enlarged, cut-away side view of the land sensor device of FIG. 4a, the land sensor device in a deployed/armed position, according to a first embodiment of the invention.

As can be seen in FIGS. 4c and 4d, the housing 237 has a hole 241 at the top, to which is attached the trigger sleeve 252 of the trigger mechanism. The housing 237 also contains a plunger button 238 at the top of the plunger 234, and a spring 240 to bias the plunger button 238 away from the trigger sleeve 252. A plunger plate 239 directly under the plunger button 238 abuts against the bottom of the housing 237 in this position.

Figure 4E:
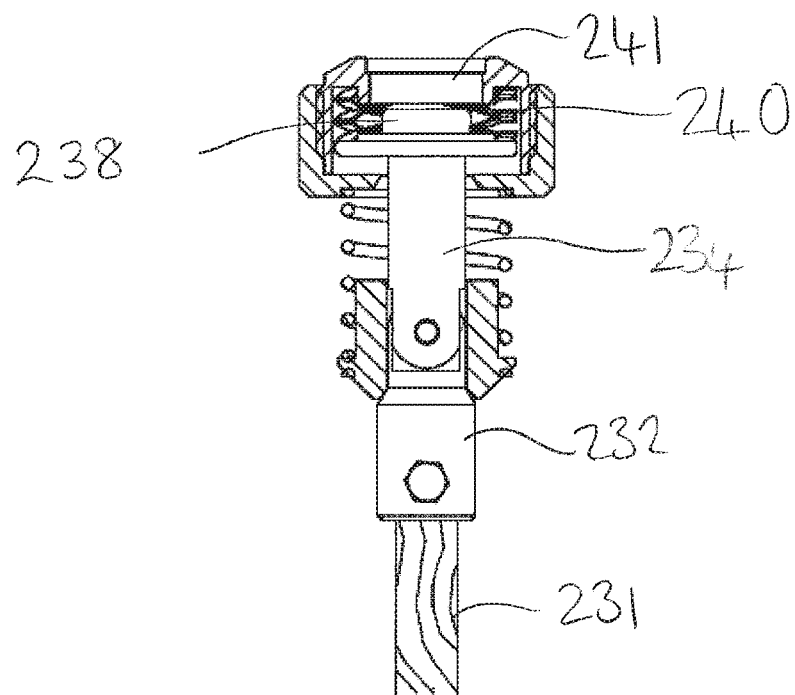
FIG. 4e shows an enlarged, cut-away side view of the land sensor device of FIG. 4a, the land sensor device in a triggered position, according to a first embodiment of the invention.
Figure 4F:
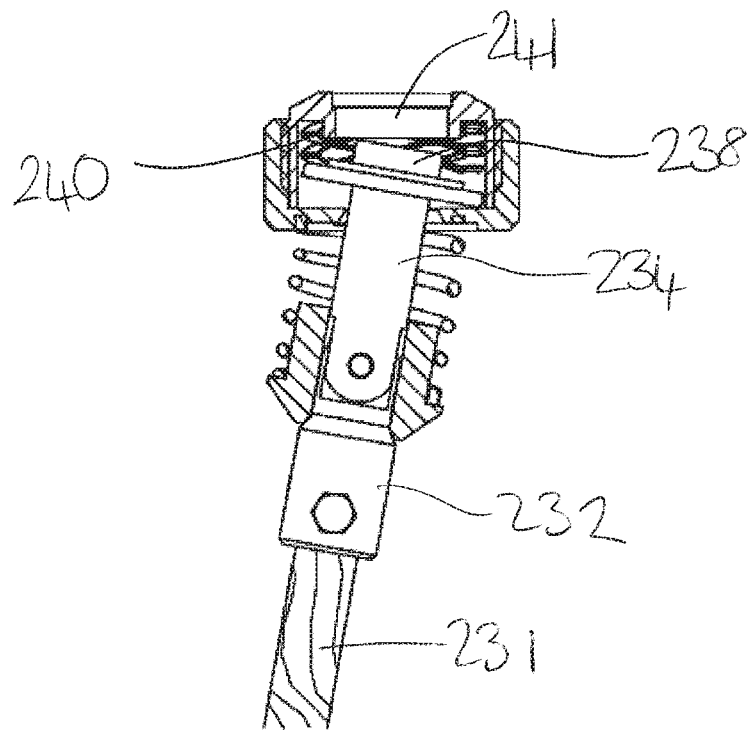
FIG. 4f shows an enlarged, cut-away side view of the land sensor device of FIG. 4a, the land sensor device in an angled-triggered position, according to a first embodiment of the invention.

FIGS. 4e and 4f show the land sensor device 230 when the rod has been triggered by contact with the ground (upon landing). The rod 231 pushes on the plunger 241 and the plunger button 238 moves upwards, against the bias of spring 240 (and spring 236) to contact with the trigger sleeve 252 to trigger the trigger mechanism 250. In FIG. 4e, the rod 231 experiences a largely longitudinal force. However, in FIG. 4f, the rod 231 is at an angle to the ground and is pushed at an angle to its longitudinal direction. As can be seen in FIG. 4f, the plunger button 238 is still able to reach the hole 241 to trigger the trigger sleeve 252.

Figure 5A:
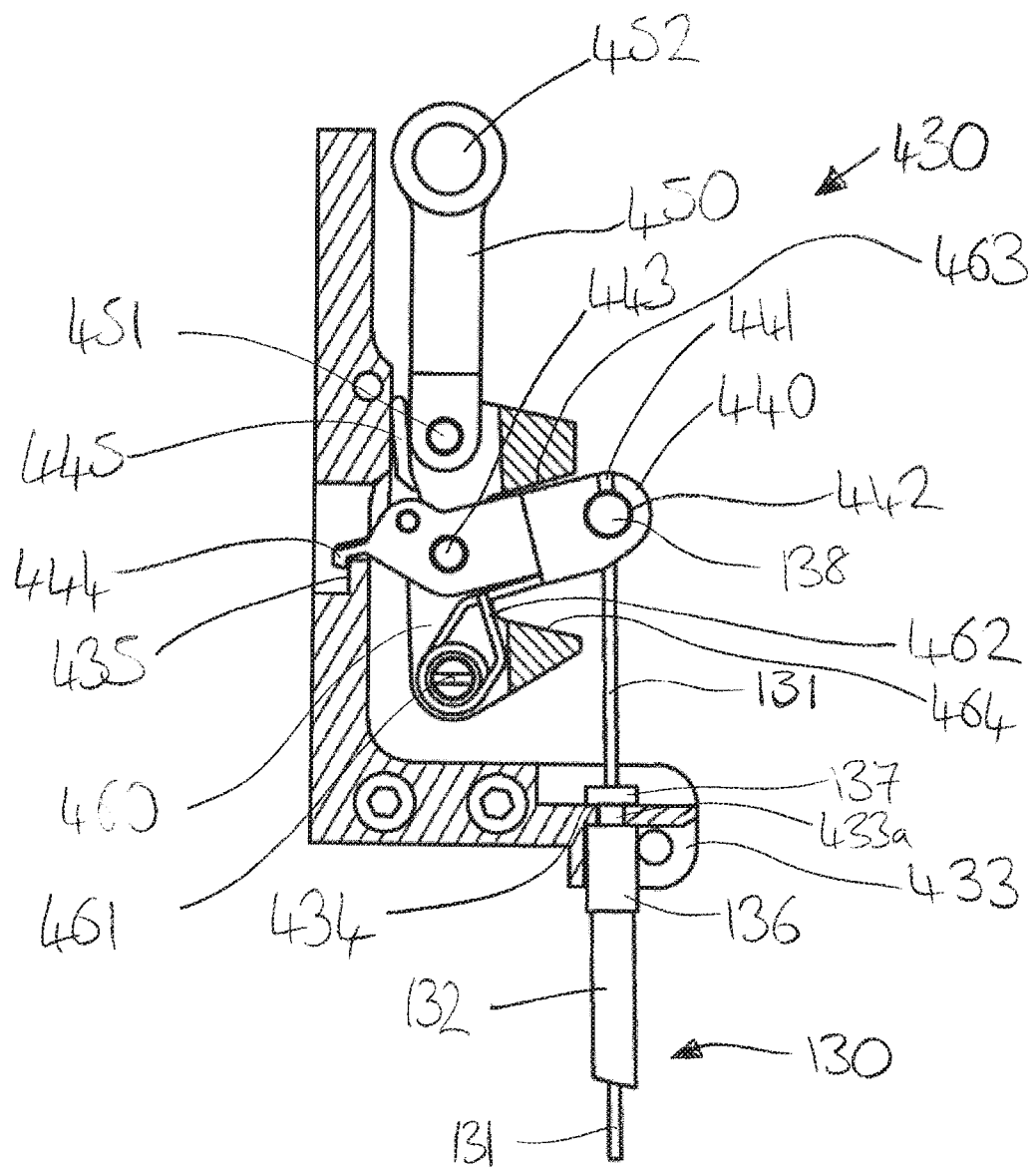
FIG. 5a shows a cut-away, internal side view of a release mechanism body, comprising a link assembly, the link assembly being in an un-triggered position, according to a first embodiment of the invention.
Figure 6A:
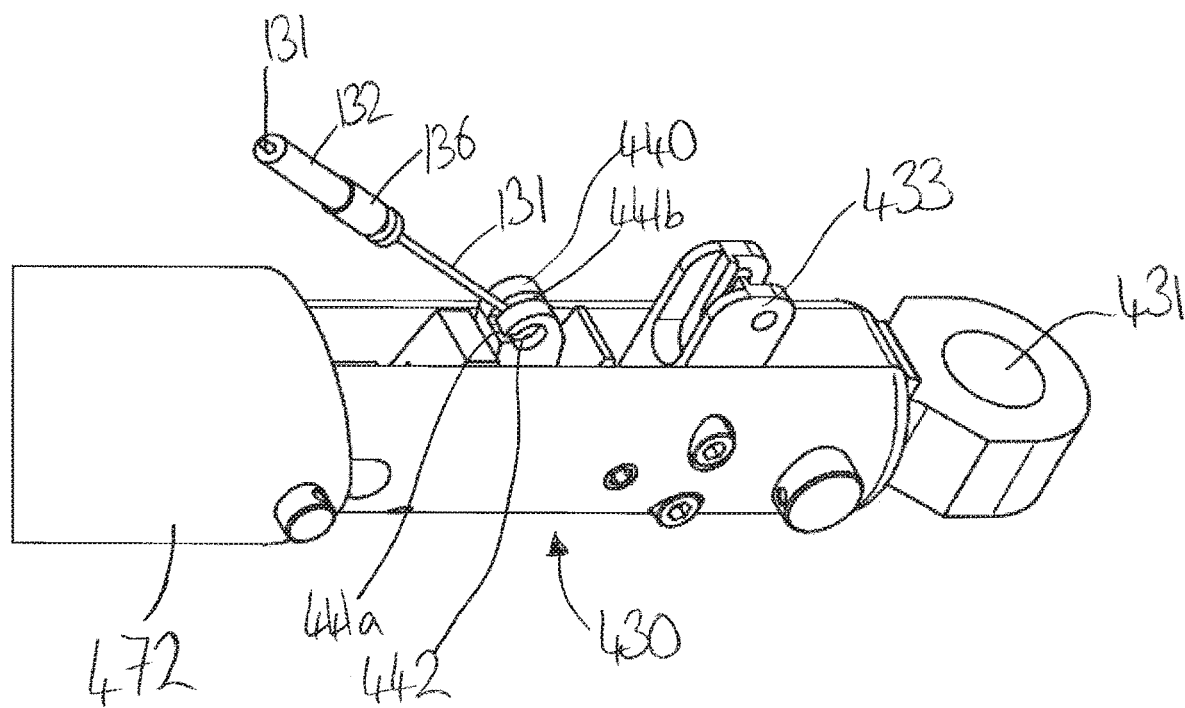
FIG. 6a shows a perspective view of part of the release mechanism body, showing a first stage of attachment of the transmit cable to the release mechanism body, according to a first embodiment of the invention.
Figure 6B:
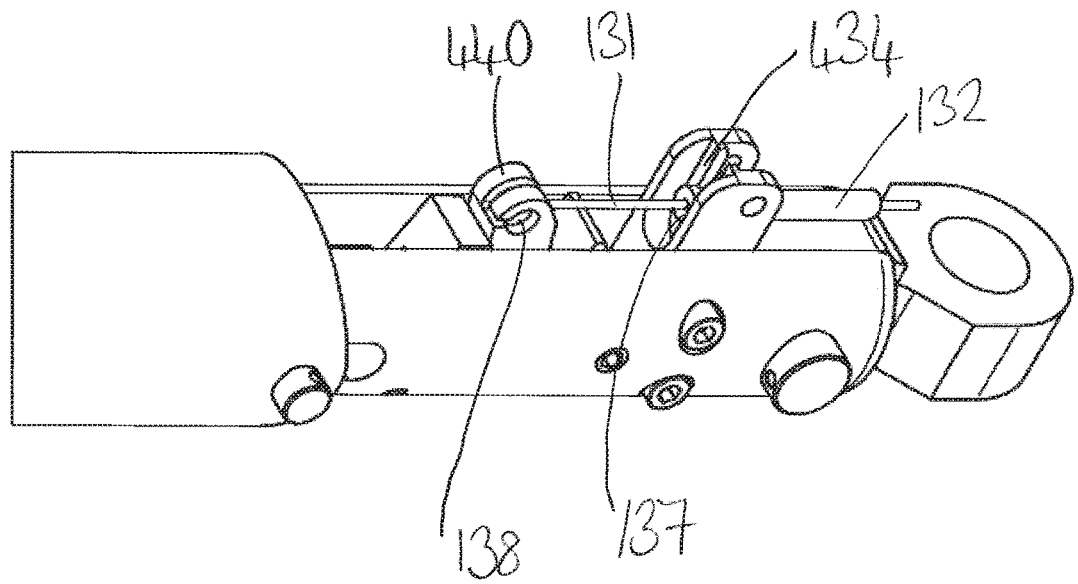
FIG. 6b shows a perspective view of part of the release mechanism body, showing a second stage of attachment of the transmit cable to the release mechanism body, according to a first embodiment of the invention.

FIG. 5a shows a cut-away, internal side view of the release mechanism body 430, comprising a link assembly 440, 450, 460, the link assembly being in an un-triggered position. The trigger assembly is mounted on an "L" shaped bracket 433 that is attached to the release mechanism body 430. As can be seen in FIGS. 6a and 6b, the "upright" of the "L" is contained within the main body 430 and the end of the "side part" of the "L" extends out of the main body 430. It is covered by cover 432, in use.

A second end of the transmit cable 130 is attached to the bracket 433. The second end of the cable 130 is similar to the first end in that there is a cylindrical nub 138 at a second end of the inner cable line 131 of the transmit cable 130. The outer casing 132 of the transmit cable has a second end frame 136 attached to it. The end frame 136 has a circular end frame plate 137 on a neck portion. The end plate 137 sits above a slot 433a on the "side part" of the "L" bracket 433 with the neck of the end frame passing through the slot 433a.

The nub 138 of the inner cable 131 is held within a hole 442 in a first link 440. As can be seen in FIGS. 6a and 6b, the nub 138 is placed through the hole 442 while the inner cable line 131 is passed through a slot 441a on the far side of the hole 442 (away from the "side part" of the "L" bracket. The cable 130 is then rotated so that the inner cable line 131 pivots through a second slot 441b. The neck of the end frame can then be slid through slot 433a so that the end plate 137 of the end frame 136 sits against an abutment surface 434 of the bracket 433.

FIGS. 6a and 6b also show that the release mechanism body 430 has an attachment hole 431, through which the bolt 413 of the first attachment portion 410 passes, to attach the first attachment portion 410 to the release mechanism body 430.

Going back to FIG. 5a, the first link 440 is pivotally mounted to a third link 460. There is a second link 450 that is also pivotally mounted to the third link 460. The third link 460 is then pivotally mounted to the release mechanism body 430.

The first link 440 has the hole 442 attached to the inner cable line 131 at one end. At a second opposite end is a latch hook 444 and towards the second end is the pivot point 443 where the first link is pivoted to the third link 460. The latch hook 444, as shown in FIG. 5a, is latched onto a latch surface 435 of the "L" bracket 433. The first link 440 also has a pivotable extension part 445 extending substantially upright, as shown in FIG. 5a. This extension part 445 sits between the "upright" of the "L" bracket and the second link 450.

The second link 450 is substantially upright, as shown in FIG. 5a. It has a pivot point 451 at its lower end, where it is pivotally mounted to the third link 460. At its upper end, it has an attachment hole 452 for attaching to a collar 481 of a collar release arrangement 480, as will be described later.

The third link 460 is roughly "C" shaped, and is pivotally mounted to the release mechanism body 430 at pivot point 461 at a "lower corner" of the "C". The first link 440 is pivotally mounted approximately half way up the "upright" of the "C" and the second link 450 is pivotally mounted at an "upper corner" of the "C". The inner surfaces of the "arms" of the "C" provide an upper abutment surface 463 upon which an upper surface of the first link 440 is abutting in FIG. 5a, and a lower abutment surface 464. The third link 460 also has a spring 462 mounted around its pivot point 461 and acting on a lower surface of the first link 440 to urge it into abutment against surface 463, as shown in FIG. 5a.

Figures 5B, 5C:
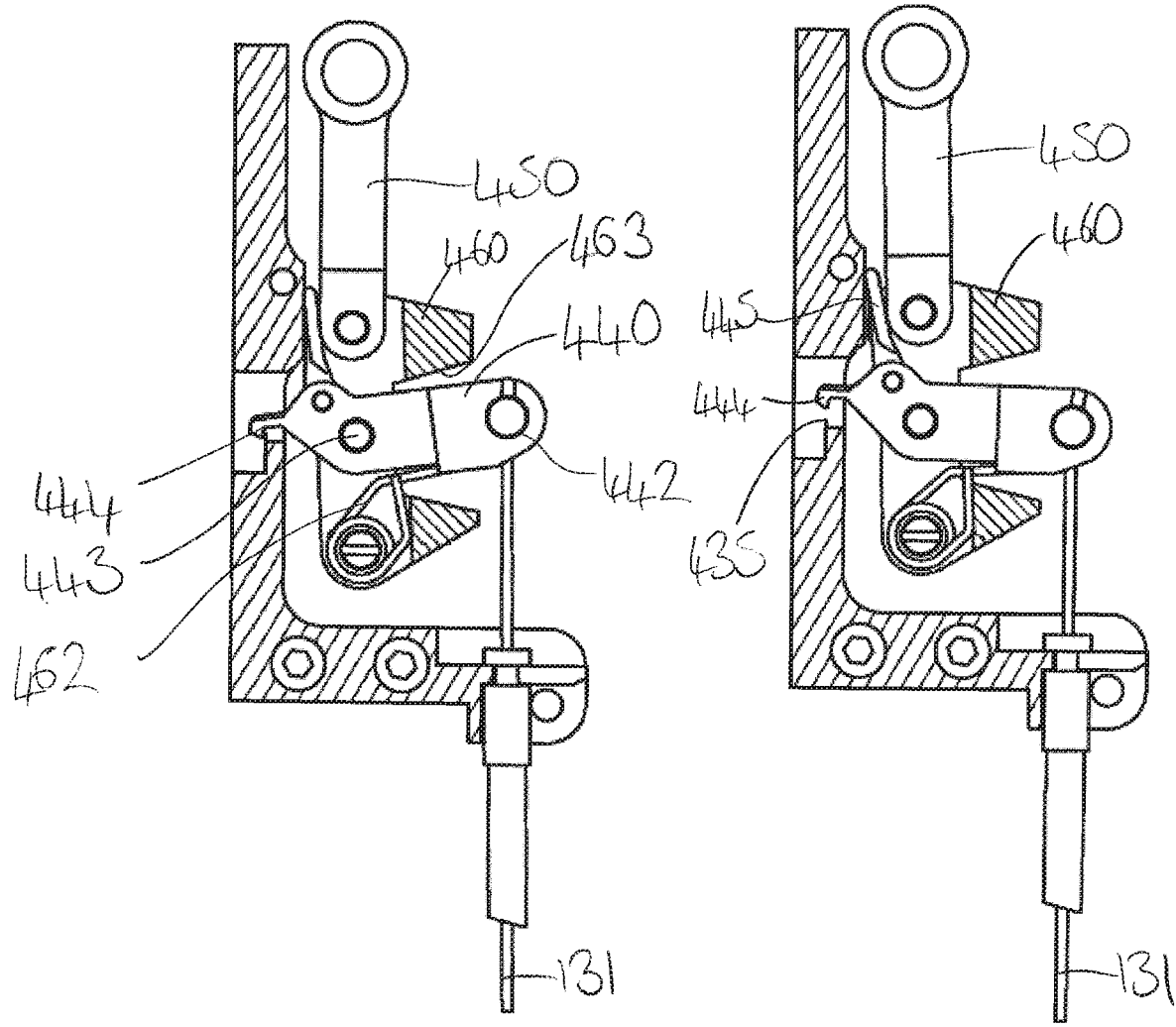
FIG. 5b shows a cut-away, internal side view of the release mechanism body of FIG. 5a, comprising a link assembly, the link assembly being in an initially-triggered position, according to a first embodiment of the invention.
FIG. 5c shows a cut-away, internal side view of the release mechanism body of FIG. 5a, comprising a link assembly, the link assembly being in a further-triggered position, according to a first embodiment of the invention.

FIG. 5a shows the link assembly 440, 450, 460 in the un-triggered position. As the inner cable line 131 is pulled downwards, as shown in FIG. 5b, this pulls on the hole 442 of the first link 440 to pivot the right hand end of the first link 440 downwards against the spring 462. The left hand end of the first link 440 lifts up and unlatches the latch hook 444 from latch surface 435.

As the inner cable line 131 is further pulled, as shown in FIG. 5c, the first link 440 further pivots so that the extension 445 starts to act on the second link 450 to move it away from the "upright" of the "L" bracket 433 and so its pivot point 451 moves to be directly above pivot point 461.

Figure 5D:
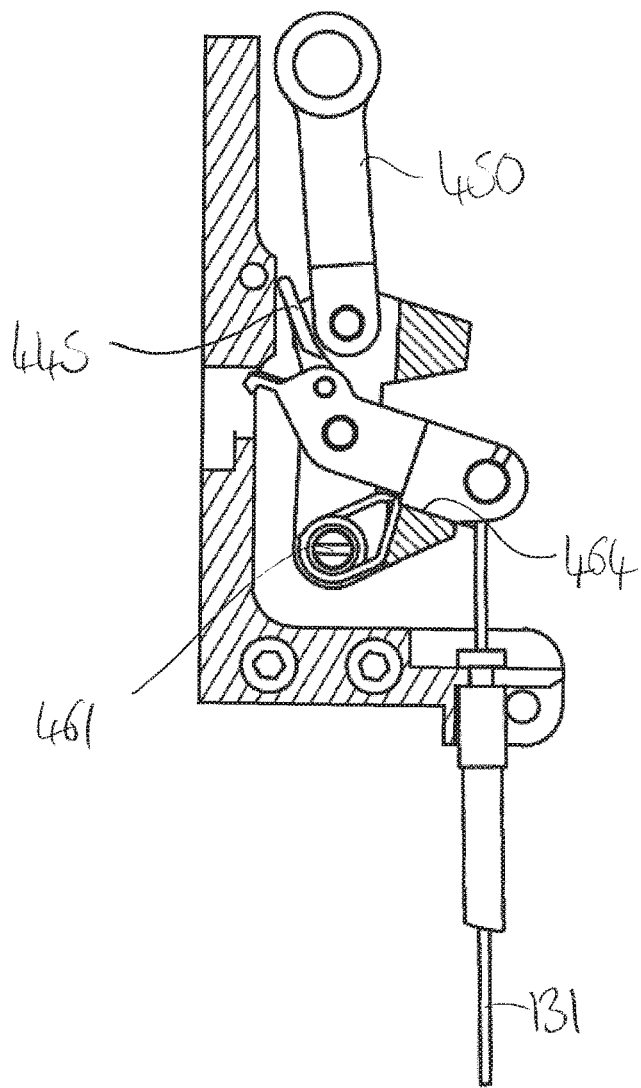
FIG. 5d shows a cut-away, internal side view of the release mechanism body of FIG. 5a, comprising a link assembly, the link assembly being in an abutting-triggered position, according to a first embodiment of the invention.

As the inner cable line 131 is further pulled, as shown in FIG. 5d, the first link 440 abuts against abutment surface 464. This causes the third link 463 to pivot about pivot point 461.

Figure 5E:
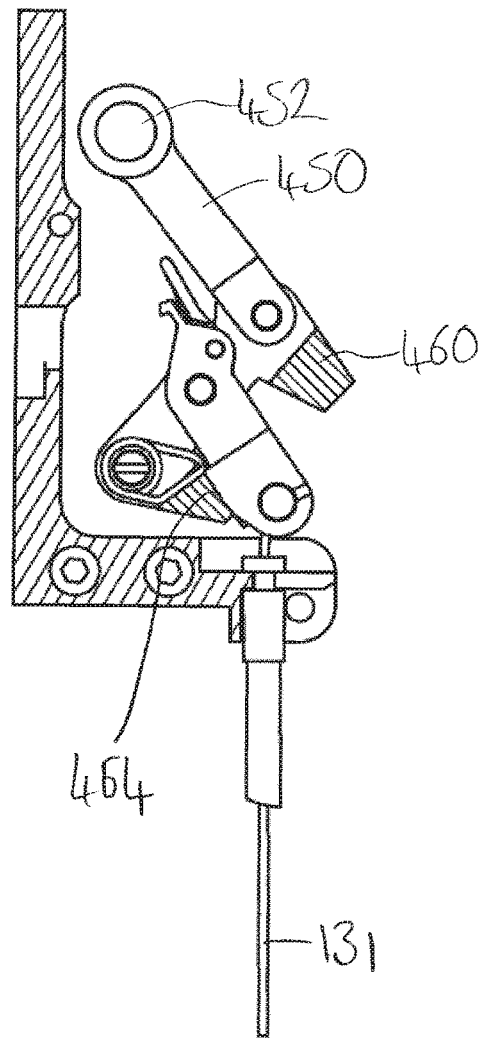
FIG. 5e shows a cut-away, internal side view of the release mechanism body of FIG. 5a, comprising a link assembly, the link assembly being in a fully-triggered position, according to a first embodiment of the invention.

FIG. 5e shows the link assembly 440, 450, 460 in a fully triggered position, where the third link 460 has pivoted clockwise to the point where the first link 440 abuts against a lower surface of the bracket 433. The second link 450 has pivoted anti-clockwise. As the third link 460 pivots clockwise and the second link 450 pivots anti-clockwise at the same time in the process, this causes the hole 452 in the second link 450 to suddenly drop so that it can provide a sudden pulling motion on the collar 481 attached to the hole 452.

Figure 6C:
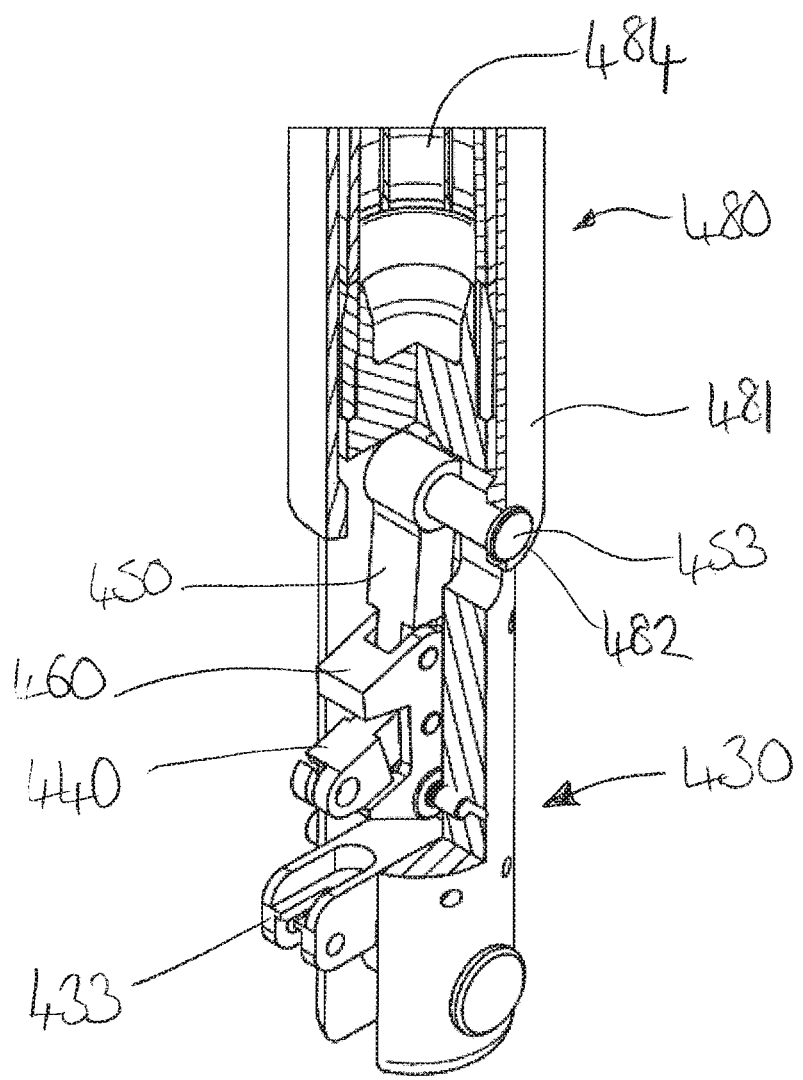
FIG. 6c shows a perspective cut-away view of part of the release mechanism body, showing connection of the link assembly to a collar of a collar release arrangement, according to a first embodiment of the invention.

FIG. 6c shows a perspective cut-away view of part of the release mechanism body 430, showing connection of link 450 to a collar 481 of a collar release arrangement 480. The connection is formed by a pin 453 passing through hole 452 in link 450. The pin also passes through a hole 482 in a first end of the collar 481 and a flanged end of the pin 453 prevents the pin from disconnecting from the collar 481.

Figure 7A:
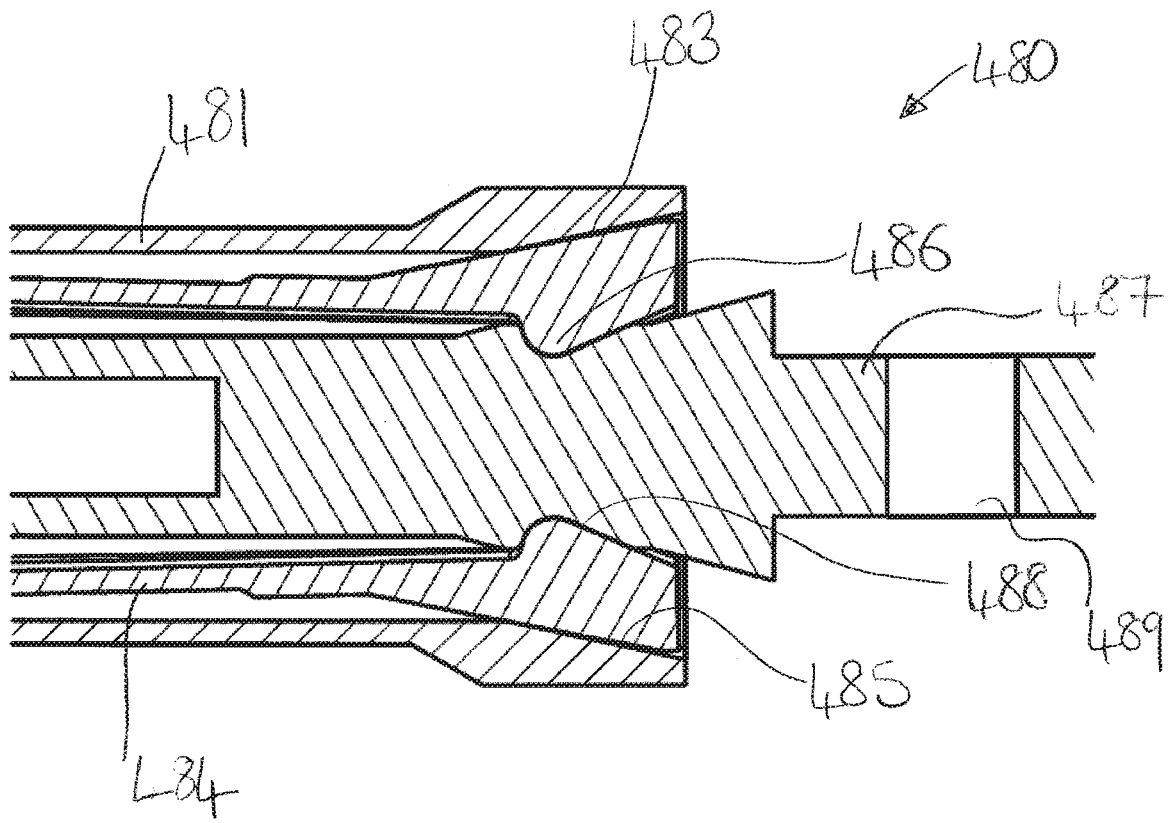
FIG. 7a shows a side cut-away view of the collar release arrangement, the collar release arrangement being in an un-released position, according to a first embodiment of the invention.

FIG. 7a shows a side cut-away view of the collar release arrangement 480, the collar release arrangement being in an un-released position. The collar release arrangement 480 comprises a collar 481, attached to the second link 450 at its first end, as already described. At its second end, the collar 481 has an inner wall that slopes outwards 483 (right hand side, as shown in FIG. 7a). The collar 481 surrounds a collet 484 that has 8 expandable fingers. The fingers of the collet 484 have outer walls that have a slope 485 at their far end that corresponds to the slope 483 of the collar 481. The inner walls of the fingers of the collet 484 have a nub 486 on them. A releasable pin 487 is located within the collet 484 and has a corresponding groove 488 that accommodates the nub 486 of the collet 484. The pin 487 also has a bolt hole 489 for attaching second attachment portion 420 with bolt 421. This collar release arrangement 480 is located within and through the outer sleeve 473 already described.

Figure 7B:
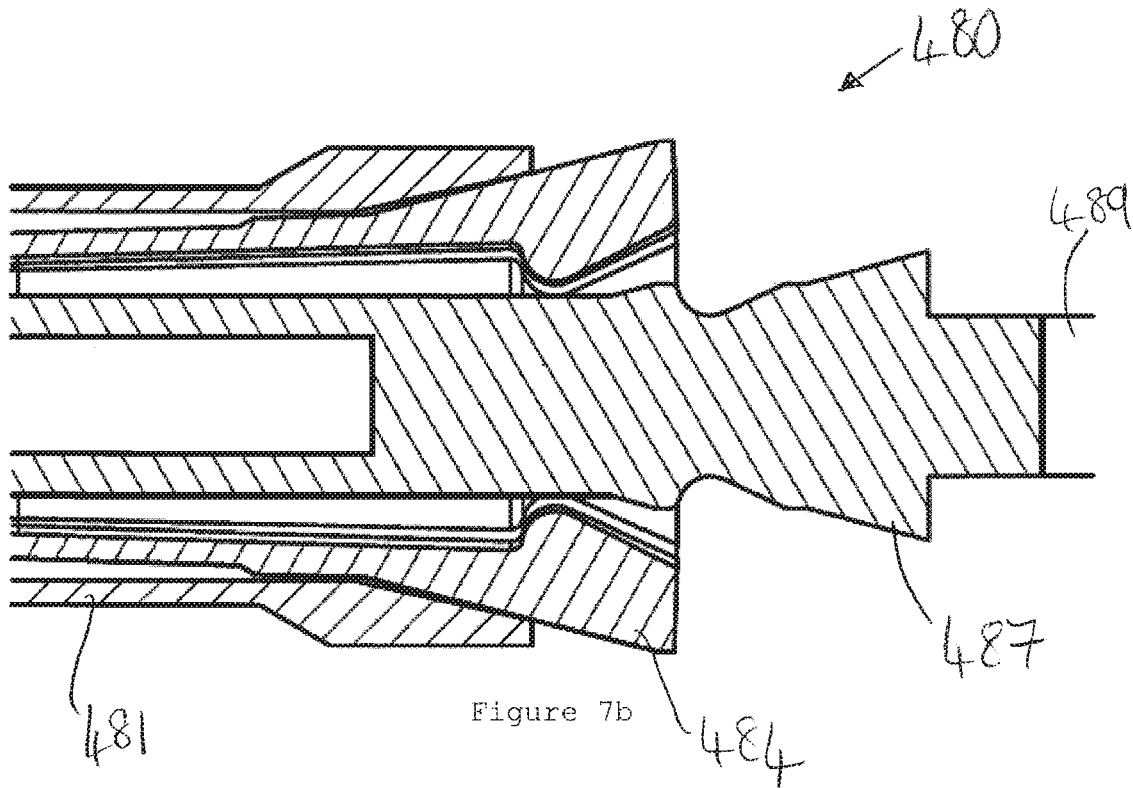
FIG. 7b shows a side cut-away view of the collar release arrangement, the collar release arrangement being in a released position, according to a first embodiment of the invention.

As shown in FIG. 7a, the collar release arrangement 480 is in the unreleased position. When the collar 481 is pulled (towards the left, as shown in FIG. 7a), this pulls the sloped surface 483 backwards, which releases the fingers of the collet 484 and allows them to expand. This releases the nub 486 of the collet 484 from the pin groove 488 and allows the release pin 487 to move towards the right hand side, as shown in FIG. 7b. There is a spring (not shown) which urges this movement of the pin 487, even in the absence of a tension load from the parachute.

In use, it is chosen whether a water sensor device 210 or a land sensor device 230 is most appropriate, depending on the proposed landing site of the aerial delivery apparatus. The appropriate sensor device 210/230 is attached to the trigger mechanism 250 so that, in use the trigger plate 252 can be triggered by the sensor device 210/230. The first attachment portion 410 is attached to the payload with webbing pole 411 and also to the release mechanism body 430 by bolt 413 through hole 431. The second attachment portion 420 is attached to the parachute with webbing pole 423 and also to the release mechanism body 430 by bolt 421 through hole 489 in pin 487. The second end of the transmit cable 130 is then attached to the first link 440 and bracket 433, as previously described. The first end of the transmit cable 130 is then attached to the trigger mechanism 250, as previously described, picking the most appropriate hole 261 in the attachment arrangement 260 of the trigger mechanism 250. The sensor device 210/230 is then located on the aerial delivery apparatus in a suitable location. If a land sensor 230 is being used, the sensor device 230 is placed in its stowed position with the rod 231 resting on an aircraft floor, or other suitable surface, so that it moves to the armed position upon leaving the aircraft or other such defined event.

Upon landing, the water/land sensor device 210/230 detects water/ground, as previously described. This causes the trigger sleeve 252 of the trigger mechanism 250 to push against the spring 253, to release the collet 254 and plunger rod 255. This causes the inner cable line 131 to be pulled by the plunger rod 255 and this mechanical force is transmitted through the inner cable line 131 so that it pulls on first link 440 of the release mechanism body 430. This causes hole 451 of second link 450 to be pulled and so pull on collar 481 of the collar release arrangement 480. This causes the pin 487 to be released from the collar 481 and collet 484. As the second attachment portion 420 is attached to the pin 487, this also causes the second attachment portion, and therefore the parachute, to be released from the rest of the disconnect assembly 100 and the payload.

While some embodiments have been described and illustrated, it will be appreciated by those of ordinary skill in the art that the embodiments lend itself to many different variations not specifically illustrated herein. By way of example only, certain possible variations will now be described.

Of course, it may be that both a land sensor device 230 and a water sensor device 210 are used. If using a land sensor 230, the rod 231 may alternatively be held in its stowed position, while on the aircraft, by a cord or line. If using a water sensor device 230, the device 230 may also have a spray shield.

The release collar and releasable pin may be replaced by any suitable release component and associated releasable component, such as a release lever and releasable block. Spring 250 may be replaced with a charged gas cylinder, for example.

Some embodiments generally pertain to a disconnect assembly for disconnecting a parachute of an aerial delivery apparatus from a payload of the aerial delivery apparatus. The disconnect assembly may include a detector device for detecting that the aerial delivery apparatus has landed, a disconnect device for providing a releasable connection between the parachute and the payload, and a transmit cable for transmitting a mechanical trigger force from the detector device to the disconnect device.

Having a transmit cable may allow the detector device and the disconnect device to be separated, potentially by a considerable distance, on the aerial delivery apparatus. This means that the detector device can be located on the aerial delivery apparatus, where the detection can be most effective. For example, the detector device may be located in a lower region of the apparatus, and in some embodiments, located to hang lower than a lowest point of the rest of the apparatus. This allows ground contact or water contact to be effectively detected. Hence, the use of "load-off" detection to try to detect landing of the aerial delivery apparatus may be avoided.

In another embodiment, the disconnect device may be located on the aerial delivery apparatus, where the disconnection can be most effective. For example, the disconnect device can be located on a parachute riser, where disconnection allows the parachute to be effectively released from the apparatus.

In some further embodiments, the transmit cable transmits a mechanical force from the detector device to the disconnect device. In other words, the transmit cable provides a physical connection between the two devices. For example, the transmit cable transmits the force through physical movement of a part of the transmit cable.

In another embodiment, the detector device is arranged such that, upon landing of the aerial delivery apparatus, the detector device detects that the aerial delivery apparatus has landed, and a mechanical trigger force is transmitted by the transmit cable from the detector device to the disconnect device and the disconnect device releases the connection between the parachute and the payload.

In yet another embodiment, the transmit cable may include an inner force transmitting line moveable within an outer housing. Such a cable is known as a Bowden cable. The inner force transmitting line physically moves in relation to the outer housing to transmit the force.

In some embodiments, the transmit cable may have a length of 1 to 15 meters, and in certain embodiments, have a length of 1 to 10 meters. The cable may be configured to transmit a pulling force. The outer housing may include a helix, and in some embodiments, a twin-trapezoidal helix. This minimizes the change in length of the cable as it is flexed or coiled.

The transmit cable may have an attachment plate on one or both ends of the outer housing. This allows the end(s) of the housing to be attached to the detector device and/or disconnect device in a fixed manner and for "pull out" of the cable to be prevented. The transmit cable may have an attachment nipple on one or both ends of the inner line. This allows the end(s) of the inner line to be easily attached to attachment points on the detector device and/or disconnect device, for example, without the use of tools.

In some embodiments, the disconnect device may include a first attachment portion (at one end) for attaching to a parachute, a second attachment portion (at an opposite end) for attaching to a payload, and a releasable mechanism for releasably connecting the first and second attachment portions. The release mechanism may be located between a payload suspension fitting and a suspension riser of the aerial delivery apparatus.

In certain embodiments, the releasable mechanism may include a release component and associated releasable component, releasably held by the release component, such as a release collar and a releasable pin, releasably held by the release collar. Alternatively, the release collar may be replaced by a release lever and/or the releasable pin may be replaced by a releasable block. This allows a robust mechanical release mechanism that does not to rely on the use of pyrotechnics to provide the disconnection. This means that the release mechanism can be easily re-used and does not need costly or time-consuming refurbishment. In the following statements, the release collar and releasable pin example will be used. However, these statements equally apply to any release component and associated releasable component:

In these embodiments, the releasable mechanism further includes a release collet, where the releasable pin is releasably held by the release collet, and where the release collar clamps the release collet so as to ensure the release collet holds the releasable pin when the release collar is in a release collar locking position. This means that the release mechanism can be easily re-used, perhaps by simply replacing the collet, and does not need costly or time-consuming refurbishment.

In some embodiments, the disconnect assembly may include an impact protector, for example, made of foam or another impact-absorbing material.

The releasable pin of the disconnect device may have a groove on an external surface. The release collet may have a plurality of, for example, eight splayable fingers. The release collet may have a nub, corresponding to the groove of the pin, on an interior surface, for example on an interior surface of one or more of the splayable fingers. The release collar may be designed to clamp over the splayable fingers of the collet to prevent them from splaying. The releasable pin may be biased towards a released position. This ensures that, even when there is no tension through the disconnect device, the release collet releases the pin when the release collar is in the release collar unlocking position.

In some embodiments, the releasable mechanism further includes a link assembly connected to the release collar to move it from the release collar locking position to a release collar unlocking position.

In certain embodiments, the link assembly may include a first link attached to the transmit cable (in particular, the inner line of the transmit cable) and a second link attached to the release collar, and when the mechanical trigger force is transmitted by the transmit cable (in particular, the inner line of the transmit cable) to the first link, the first link is caused to move towards a first link unlocking position, which causes the second link to move towards a second link unlocking position and for the release collar to move towards its release collar unlocking position.

In some additional embodiments, the link assembly may include a third link, connecting the first and second links, wherein the first and second links are pivotally connected to the third link and wherein the third link is pivotally connected to a housing of the release mechanism, such that when the mechanical trigger force is transmitted by the transmit cable to the first link, the first link is caused to pivot towards the first link unlocking position, which causes the third link to pivot with respect to the release mechanism housing towards a third link unlocking position, which causes the second link to pivot towards the second link unlocking position and for the release collar to move towards its release collar unlocking position.

In some further embodiments, the pivotal connections on the third link in relation to the release mechanism housing, first link and second link are substantially in line such that initial pivoting of the first link with respect to the third link does not cause the third link or second link to pivot. This allows the link assembly to act as an "over-centre" mechanism such that after an initial pivoting motion, the link assembly "topples" quickly to provide a fast disconnection.

In yet some other embodiments, the first link includes a latch for engaging with a latch surface of the release mechanism, such that initial pivoting of the first link causes the latch to be unlatched. The latch surface may be on the release mechanism housing. Having a latch prevents premature disconnection, for example, in the event of a transverse shock load.

In certain embodiments, further pivoting of the first link with respect to the third link causes an abutment surface of the first link to abut against an abutment surface of the third link and thus causes the third link to pivot with the first link with respect to the release mechanism housing.

In additional embodiments, the first link may include a link extension which pivots with the first link and acts on the second link to urge the second link towards its second link unlocking position. The link extension may act as a lever between the release mechanism housing and the second link.

In an embodiment, the link assembly may include a biasing member to bias the first link towards its first link locking position. The trigger force movement may move the first link against this bias.

In certain embodiments, the detector device may include a trigger mechanism having a trigger plate, the trigger plate being moveable from a non-triggered position to a triggered position upon landing of the aerial delivery apparatus.

In these embodiments, the trigger mechanism is connected to the transmit cable (in particular, the inner line of the transmit cable) such that when the trigger plate moves towards its triggered position, the transmit cable (in particular, the inner line of the transmit cable) transmits the mechanical triggering force to the disconnect device.

Further, in these embodiments, the movement of the trigger plate to the triggered position is in the opposite direction to the mechanical triggering force on the transmit cable.

In some additional embodiments, the trigger mechanism comprises a trigger sleeve and a releasable plunger, releasably held by the trigger sleeve.

In these embodiments, the trigger mechanism further comprises a trigger collet, wherein the trigger sleeve clamps the trigger collet so as to ensure the trigger collet holds the releasable plunger in its non-triggered position when the trigger sleeve is in its non-triggered position. The releasable plunger of the detector device may have a groove on an external surface. The trigger collet may have a plurality of, for example eight, splayable fingers. The trigger collet may have a nub, corresponding to the groove of the plunger, on an interior surface, for example on an interior surface of one or more of the splayable fingers. The trigger collar may be designed to clamp over the splayable fingers of the trigger collet to prevent them from splaying.

Also, in these embodiments, movement of the trigger plate towards its triggered position causes the trigger sleeve to move to its triggered position, thereby allowing the releasable plunger to move to its triggered position. The trigger sleeve moving to its triggered position allows the trigger collet to release the releasable plunger and allow the plunger to move to its trigger position.

In such embodiments, the trigger sleeve is urged towards its non-triggered position by a biasing member and wherein movement of the trigger plate towards its triggered position acts on the trigger sleeve against the biasing member to move the trigger sleeve to its triggered position.

In an embodiment, the detector device includes a trigger mechanism having a trigger plate, the trigger plate being moveable from a non-triggered position to a triggered position upon landing of the aerial delivery apparatus and wherein the detector device comprises a ground-sensor device or a water-sensor device. The two different types of sensor device may be interchangeable, depending on whether the aerial delivery apparatus is going to land in the ground or on water.

If the detector device includes a ground-sensor device, the ground-sensor device may include a ground contact rod, or other similar component, for triggering the trigger plate to move to its triggered position, when the ground contact rod experiences a ground contact force. The ground contact force may be upwards or sideways.

In these embodiments, the ground contact rod is moveable from a stowed position, in which the ground contact rod cannot trigger the trigger plate, to a deployed position, where the rod is able be moved to trigger the trigger plate.

Also, in these embodiments, the ground contact rod is pivotable from the stowed to the deployed position and wherein the ground contact rod may be held in the stowed position by contact with an aircraft airframe and may automatically pivot to the deployed position on leaving the aircraft and breaking contact with the aircraft airframe. Alternatively, the ground contact rod may be held in its stowed position by a cord.

Further, in these embodiments, the ground contact rod is held in the deployed position by a locking element, the locking element acting to prevent pivoting of the ground contact rod.

Additionally, in these embodiments, the locking element is biased towards a position where pivoting is prevented and wherein the locking element automatically moves towards that position when the ground contact rod moves towards its deployed position.

Also, in these embodiments, the ground contact rod is biased away from a position in which it triggers the trigger plate. This helps to prevent premature activation.

Alternatively, in some embodiments, if the detector device includes a water-sensor device, the water-sensor device may include a water-sensing cartridge associated with a trigger rod for triggering the trigger plate to move to its triggered position, when the cartridge experiences water contact. The water-sensing cartridge may be designed to detect the presence of both fresh and salt water. The water-sensing cartridge may comprise one or more paper annuli that soften and rupture on contact with water. The water-sensor device may include a spray shield to prevent water spray causing early activation.

In these embodiments, the water-sensor device includes two or more water-sensing cartridges, each associated with a trigger rod connected to a common rocker trigger plate, wherein only one trigger rod needs to trigger the rocker plate in order for the rocker plate to be triggered. This provides a redundancy, such that only one water-sensing cartridge has to detect the presence of water for the water-sensor device to trigger the trigger plate. The rocker plate may rock due to an action of the rocker plate on a fulcrum of the water sensor-device.

According to another embodiment, a kit of parts for assembling a disconnect assembly and for disconnecting a parachute of an aerial delivery apparatus from a payload of the aerial delivery apparatus is also provided. The kit of parts includes a detector device for detecting that the aerial delivery apparatus has landed, a disconnect device for providing a releasable connection between the parachute and the payload, and a transmit cable for transmitting a mechanical trigger force from the detector device to the disconnect device.

According to yet another embodiment, there is also provided an aerial delivery apparatus that includes a parachute, a payload and a disconnect assembly as described above.

According to another embodiment, there is also provided method of disconnecting a parachute of an aerial delivery apparatus from a payload of the aerial delivery apparatus, the method including the following steps: using a detector device to detect that the aerial delivery apparatus has landed, using a transmit cable to transmit a mechanical trigger force from the detector device to a disconnect device, and using the disconnect device to release a connection between the parachute and the payload.

It will of course be appreciated that features described in relation to one aspect of the present invention may be incorporated into other aspects of the present invention. For example, the method of the invention may incorporate any of the features described with reference to the assembly of the invention and vice versa.

It will of course be appreciated that features described in relation to one aspect of the present invention may be incorporated into other aspects of the present invention. For example, the method of the invention may incorporate any of the features described with reference to the assembly of the invention and vice versa.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A disconnect assembly for disconnecting a parachute of an aerial delivery apparatus from a payload of the aerial delivery apparatus, the disconnect assembly comprising:
   a detector device configured to detect that the aerial delivery apparatus has landed,
   a disconnect device configured to provide a releasable connection between the parachute and the payload, and
   a transmit cable configured to transmit a mechanical trigger force from the detector device to the disconnect device, wherein
   when the detector device detects that the aerial delivery apparatus has landed, the transmit cable is configured to transmit a mechanical trigger force from the detector device to the disconnect device, causing the disconnect device to release the connection between the parachute and the payload; and
   wherein the disconnect device comprises a first attachment portion configured to attach to a parachute, a second attachment portion configured to attach to a payload, and a releasable mechanism configured to releasably connect the first and second attachment portions.

2. The disconnect assembly as claimed in claim 1, wherein the transmit cable comprises
   an inner force transmitting line configured to move within an outer housing.

3. The disconnect assembly as claimed in claim 1, wherein the releasable mechanism comprises
   a release component and associated releasable component releasably held by the release component releasably held by the release collar.

4. The disconnect assembly as claimed in claim 3, wherein the release component comprises a release collar and a releasable pin.

5. The disconnect assembly as claimed in claim 3, wherein the releasable mechanism further comprises
   a release collet configured to releasably hold the releasable component, and
   the release component is configured to clamp the release collet to ensure that the release collet holds the releasable component when the release component is in a release component locking position.

6. The disconnect assembly as claimed in claim 5, wherein the releasable mechanism further comprises
   a link assembly connected to the release component configured to move the release component from the release component locking position to a release component unlocking position.

7. The disconnect assembly as claimed in claim 6, wherein the link assembly comprises
   a first link attached to the transmit cable and a second link attached to the release component, and
   when the transmit cable transmits the mechanical trigger force to the first link, the first link moves towards a first link unlocking position, the movement of the first link causes the second link to move towards a second link unlocking position and causes the release component to move towards the release component unlocking position.

8. The disconnect assembly as claimed in claim 7, wherein the link assembly further comprises
   a third link configured to connect the first and second links,
   the first and second links are pivotally connected to the third link, and
   the third link is pivotally connected to a housing of the release mechanism, such that when the transmit cable transmits the mechanical trigger force to the first link, the first link pivots towards the first link unlocking position, causing the third link to pivot with respect to the release mechanism housing towards a third link unlocking position, the pivoting of the third link causes the second link to pivot towards the second link unlocking position and causes the release component to move towards the release component unlocking position.

9. The disconnect assembly as claimed in claim 8, wherein the pivotal connections on the third link in relation to the release mechanism housing, first link and second link are substantially in line such that initial pivoting of the first link with respect to the third link prevents the third link or second link from pivoting.

10. The disconnect assembly as claimed in claim 9, wherein the first link comprises
    a latch configured to engage with a latch surface of the release mechanism, such that initial pivoting of the first link causes the latch to be unlatched.

11. The disconnect assembly as claimed in claim 10, wherein further pivoting of the first link with respect to the third link causes an abutment surface of the first link to abut against an abutment surface of the third link, thus causing the third link to pivot with the first link with respect to the release mechanism housing.

12. The disconnect assembly as claimed in claim 11, wherein the first link comprises
    a link extension configured to pivot with the first link and act on the second link to urge the second link towards the second link unlocking position.

13. The disconnect assembly as claimed in claim 12, wherein the link assembly comprises
    a biasing member configured to bias the first link towards the first link locking position.

14. The disconnect assembly as claimed in claim 13, wherein the detector device comprises
    a trigger mechanism having a trigger plate, the trigger plate being moveable from a non-triggered position to a triggered position upon landing of the aerial delivery apparatus.

15. The disconnect assembly as claimed in claim 14, wherein the trigger mechanism is connected to the transmit cable, and when the trigger plate moves towards the triggered position, the transmit cable is configured to transmit the mechanical triggering force to the disconnect device.

16. The disconnect assembly as claimed in claim 15, wherein the movement of the trigger plate to the triggered position is opposite to that of the mechanical triggering force on the transmit cable.

17. The disconnect assembly as claimed in claim 16, wherein the trigger mechanism comprises a trigger sleeve and a releasable plunger, releasably held by the trigger sleeve.

18. The disconnect assembly as claimed in claim 17, wherein the trigger mechanism further comprises a trigger collet, wherein the trigger sleeve is configured to clamp the trigger collet to ensure that the trigger collet holds the releasable plunger in a non-triggered position when the trigger sleeve is in the non-triggered position.

19. The disconnect assembly as claimed in claim 18, wherein movement of the trigger plate towards a triggered position causes the trigger sleeve to move to the triggered position, allowing the releasable plunger to move to the triggered position.

20. The disconnect assembly as claimed in claim 19, wherein the trigger sleeve is urged towards a non-triggered position by a biasing member, and movement of the trigger plate towards the triggered position is configured to act on the trigger sleeve against the biasing member moving the trigger sleeve to the triggered position.

21. The disconnect assembly as claimed in claim 13, wherein the detector device comprises a trigger mechanism having a trigger plate, the trigger plate being moveable from a non-triggered position to a triggered position upon landing of the aerial delivery apparatus and the detector device further comprises a ground-sensor device or a water-sensor device.

22. The disconnect assembly as claimed in claim 21, wherein the detector device comprises a ground-sensor device comprising a ground contact rod configured to trigger the trigger plate to move to a triggered position, when the ground contact rod experiences a ground contact force.

23. The disconnect assembly as claimed in claim 22, wherein the ground contact rod is moveable from a stowed position, in which the ground contact rod cannot trigger the trigger plate, to a deployed position, where the rod is able be moved to trigger the trigger plate.

24. The disconnect assembly as claimed in claim 23, wherein the ground contact rod is pivotable from the stowed to the deployed position, is held in the stowed position by contact with an aircraft airframe, or is automatically pivoted to the deployed position on leaving the aircraft and breaking contact with the aircraft airframe.

25. The disconnect assembly as claimed in claim 24, wherein the ground contact rod is held in the deployed position by a locking element, the locking element acting to prevent pivoting of the ground contact rod.

26. The disconnect assembly as claimed in claim 25, wherein the locking element is biased towards a position where pivoting is prevented, and moves towards the position where pivoting is prevented when the ground contact rod moves towards a deployed position.

27. The disconnect assembly as claimed in claim 26, wherein the ground contact rod is biased away from a position in which the ground contact rod triggers the trigger plate.

28. The disconnect assembly as claimed in claim 20, wherein the detector device comprises a water-sensor device, the water-sensor device comprises a water-sensing cartridge associated with a trigger rod configured to trigger the trigger plate to move to the triggered position, when the cartridge experiences water contact.

29. The disconnect assembly as claimed in claim 28, wherein the water-sensor device comprises two or more water-sensing cartridges, each associated with a trigger rod connected to a common rocker trigger plate, and only one trigger rod needs to trigger the rocker trigger plate in order for the rocker plate to be triggered.

30. A kit of parts for assembling a disconnect assembly, wherein the disconnect assembly is for disconnecting a parachute of an aerial delivery apparatus from a payload of the aerial delivery apparatus, the kit of parts comprising:
   a detector device configured to detect that the aerial delivery apparatus has landed;
   a disconnect device configured to provide a releasable connection between the parachute and the payload; and
   a transmit cable configured to transmit a mechanical trigger force from the detector device to the disconnect device; and
   wherein the disconnect assembly is configured such that, when the detector device detects that the aerial delivery apparatus has landed, the transmit cable is configured to transmit a mechanical trigger force from the detector device to the disconnect device, causing the disconnect device to release the connection between the parachute and the payload, and
   wherein the disconnect device comprises a first attachment portion configured to attach to a parachute, a second attachment portion configured to attach to a payload, and a releasable mechanism configured to releasably connect the first and second attachment portions.

31. An aerial delivery apparatus, comprising
   a parachute,
   a payload, and
   a disconnect assembly comprising
      a detector device configured to detect that the aerial delivery apparatus has landed,
      a disconnect device configured to provide a releasable connection between the parachute and the payload, and
      a transmit cable configured to transmit a mechanical trigger force from the detector device to the disconnect device, wherein
      when the detector device detects that the aerial delivery apparatus has landed, the transmit cable is configured to transmit a mechanical trigger force from the detector device to the disconnect device, causing the disconnect device to release the connection between the parachute and the payload, and
      wherein the disconnect device comprises a first attachment portion configured to attach to a parachute, a second attachment portion configured to attach to a payload, and a releasable mechanism configured to releasably connect the first and second attachment portions.

32. A method of disconnecting a parachute of an aerial delivery apparatus from a payload of the aerial delivery apparatus, the method comprising:
   providing a disconnect assembly comprising:
      a detector device configured to detect that the aerial delivery apparatus has landed,
      a disconnect device configured to provide a releasable connection between the parachute and the payload, and
      a transmit cable configured to transmit a mechanical trigger force from the detector device to the disconnect device, wherein when the detector device detects that the aerial delivery apparatus has landed, the transmit cable is configured to transmit a mechanical trigger force from the detector device to the disconnect device, causing the disconnect device to release the connection between the parachute and the payload, and wherein the disconnect device comprises a first attachment portion configured to attach to a parachute, a second attachment portion configured to attach to a payload, and a releasable mechanism configured to releasably connect the first and second attachment portions; and detecting, by the detector device, that the aerial delivery apparatus has landed, transmitting, by the transmit cable, the mechanical trigger force from the detector device to the disconnect device, and releasing, by the disconnect device, the connection between the parachute and the payload.

\* \* \* \* \*

UNITED STATES PATENT AND TRADEMARK OFFICE
CERTIFICATE OF CORRECTION

PATENT NO. : 11,130,584 B2
APPLICATION NO. : 15/937805
DATED : September 28, 2021
INVENTOR(S) : Martyn Philip Jones and Richard Anthony Laws It is certified that error appears in the above-identified patent and that said Letters Patent is hereby corrected as shown below:

In the Claims

Column 15, Lines 46-50 should read:
3. The disconnect assembly as claimed in claim 1, wherein the releasable mechanism comprises a release component and associated releasable component releasably held by the release component.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*